US012708990B2

(12) United States Patent
Wang et al.

(10) Patent No.: US 12,708,990 B2
(45) Date of Patent: Aug. 18, 2026

(54) NAIL GUN

(71) Applicant: Positec Power Tools (Suzhou) Co., Ltd, Jiangsu (CN)

(72) Inventors: Zhiwei Wang, Jiangsu (CN); Xiangliang Zhang, Jiangsu (CN); Hongbing Wu, Suzhou (CN); Shaoshan Ji, Jiangsu (CN)

(73) Assignee: Positec Power Tools (Suzhou) Co., LTD., Suzhou (CN)

( * ) Notice: Subject to any disclaimer, the term of this patent is extended or adjusted under 35 U.S.C. 154(b) by 0 days.

(21) Appl. No.: 19/173,535

(22) Filed: Apr. 8, 2025

(65) Prior Publication Data

US 2025/0235998 A1 Jul. 24, 2025

Related U.S. Application Data

(60) Division of application No. 18/208,215, filed on Jun. 9, 2023, now Pat. No. 12,290,907, which is a continuation of application No. PCT/CN2022/122609, filed on Sep. 29, 2022.

(30) Foreign Application Priority Data

Nov. 4, 2021 (CN) ......................... 202111300624.1

(51) Int. Cl.
*B25C 1/00* (2006.01)
*B25C 1/04* (2006.01)

(52) U.S. Cl.
CPC .............. *B25C 1/041* (2013.01); *B25C 1/047* (2013.01)

(58) Field of Classification Search
CPC ................................ B29C 1/041; B29C 1/047
See application file for complete search history.

(56) References Cited

U.S. PATENT DOCUMENTS

| | | | | |
|---|---|---|---|---|
| 9,539,714 | B1 | 1/2017 | Pedicini | |
| 10,730,172 | B2 * | 8/2020 | Po | B25C 1/047 |
| 2016/0096259 | A1 | 4/2016 | Pedicini | |
| 2018/0036870 | A1 * | 2/2018 | Komazaki | B25C 1/06 |
| 2018/0133877 | A1 * | 5/2018 | Ueda | B25F 5/008 |
| 2018/0290279 | A1 * | 10/2018 | Kobori | B25C 1/06 |
| 2019/0126453 | A1 * | 5/2019 | Po | B25C 1/047 |
| 2019/0168366 | A1 * | 6/2019 | Yasutomi | B25C 1/047 |
| 2019/0321955 | A1 * | 10/2019 | Carrier | B25C 1/04 |

(Continued)

OTHER PUBLICATIONS

Office Action for U.S. Appl. No. 18/208,215, mailed on Aug. 28, 2024, Wang, "Nail Gun", 9 Pages.

*Primary Examiner* — Eyamindae C Jallow
(74) *Attorney, Agent, or Firm* — Lee & Hayes, P.C.

(57) ABSTRACT

A driving tool including a driver assembly and a lifting assembly. The driver assembly includes a drivable driver member and a base arranged on the driver member, where the driver member extends longitudinally in a first axis, and a plurality of engagement holes arranged in the first axis are provided on the driver member. The lifting assembly includes a driving wheel that is driven by a power output portion to rotate and a plurality of fitting portions arranged on a periphery of the driving wheel at intervals, where the plurality of fitting portions can be alternately engaged with the corresponding engagement holes, to drive the driver member to move along the first axis, so as to drive the base to move from a starting position to a driven position.

19 Claims, 18 Drawing Sheets

(56) References Cited

U.S. PATENT DOCUMENTS

| | | | | |
|---|---|---|---|---|
| 2020/0346333 | A1* | 11/2020 | Po | B25C 1/04 |
| 2021/0205969 | A1* | 7/2021 | Zhu | B25C 1/06 |
| 2021/0323131 | A1 | 10/2021 | Hao et al. | |

* cited by examiner

NAIL GUN

CROSS-REFERENCE TO RELATED APPLICATION

This application is a divisional application of pending U.S. patent application Ser. No. 18/208,215, filed on Jun. 9, 2023, which is a continuation of PCT Application No. PCT/CN2022/122609, filed on Sep. 29, 2022, which claims priority to Chinese Patent Application No 202111300624.1, filed on Nov. 4, 2021, all of which are hereby incorporated by reference in their entirety for all purposes as if fully set forth herein.

TECHNICAL FIELD

The present disclosure relates to the field of nailing tool technologies, and in particular, to a nail gun.

BACKGROUND

A nail gun, or referred to as a fastener driver, pushes a driver member (also referred to as a firing pin) by using instantly released energy to perform a hammering motion, to shoot a fastener from a muzzle at a high speed, so as to fix an object. A direct-current nail gun generally includes an energy storage mechanism, a driver member, and a lifting assembly The driver member is driven by the lifting assembly and the energy storage mechanism to do a reciprocating motion, to compress a medium in an energy storage cylinder, so as to obtain instantly released striking energy. The nail guns are widely used in the decoration industry According to different energy systems, the nail guns may be divided into electric nail guns, pneumatic nail guns, gas nail guns, manual nail guns, and the like. Currently, driving manners used by the electric nail guns include a multi-cylinder compressed normal pressure, a high-pressure gas spring, vacuum pumping, a mechanical spring, a flywheel, a solenoid, an electromagnet, a steam heating wire, and the like. The electric nail guns driven in these manners often need to store energy by using a motor as a power source after completing a nailing operation. For example, both the high-pressure gas spring nail gun and the mechanical spring nail gun need to compress high-pressure gas or a mechanical spring by using the lifting assembly.

SUMMARY

There are different types of lifting assemblies. At present, there are a similar gear-and-rack lifting assembly, a gear-and-cam lifting assembly, an X-shaped connecting rod structure lifting assembly, a dual-gear-and-crank lifting assembly, a spindle-and-nut lifting assembly, and the like. The similar gear-and-rack lifting assembly is a relatively common lifting assembly at present. There are three common lifting structures: 1. A cam and a rack are in a transmission fit, to drive the driver member to do a reciprocating motion. However, the cam needs to be horizontally arranged on a side of the driver member, resulting in an excessively large transverse width of the lifting assembly. In addition, a requirement on the strength of the cam and the rack is high, and during nailing, a relatively large impact and vibration are generated, which is difficult to ensure the reliability of the cam and the rack. 2. The lifting assembly is designed into an X-shape connecting rod structure. When a crank rotates, a motion trajectory of a meshing element is straight or close to 0°, which can minimize a friction of load movement. However, in this solution, three layers of transmission mechanisms are superimposed, relative costs are relatively high, a requirement on the assembly and manufacturing precision is relatively high, and stuck easily occurs at a position of rotation. 3. A dual-gear-and-crank lifting solution is used, and torque is transmitted by using two cylindrical helical gears meshed with each other. However, this solution has the defects of a relatively high requirement on the strength and precision of the gears, relatively heavy in overall quality, a relatively size, and poor human-machine experience.

In addition, in some nail guns, the lifting assembly is designed as two orthogonal conical gears to transmit torque in different directions to lift the driver member. However, in a specific design, there are serious structural defects, which cause the overall volume of the nail gun to become bloated. For a to-be-fixed position close to a corner or a to-be-fixed position with a narrow processing space, a housing of the nail gun is likely to cause structural interference, which makes it impossible or inconvenient for the nail gun to act on the to-be-fixed position, resulting in very poor accessibility. In addition, due to a relatively large volume, the nail gun also has poor visibility, which is easy to block a line of sight of an operator, and a fixing situation cannot be observed in time. Limited by the influence of the lifting assembly, in the conventional techniques, the cylinder-type nail gun has a complex structure, a relatively large volume, and quite inconvenience in a user operation. Based on this, it is necessary to provide a nail gun, to improve a strength of the driver member, so that the engagement process is more stable and reliable, energy storage is better implemented, stable and reliable running of the nail gun is kept, and the operation stability and operation safety are greatly improved.

A person skilled in the art obtains other objectives of the present disclosure from the following descriptions. Therefore, the statement of the objectives is not exclusive and serves only to illustrate some of the many objectives of the present disclosure.

Correspondingly, in an aspect, an example embodiment provides a nail gun, including a housing; a power output portion, arranged on the housing; a magazine, configured to provide a fastener for the nail gun; a muzzle, configured to receive the driven fastener; a driver assembly, including a drivable driver member and a base arranged on the driver member, where the driver member extends along a first axis in a longitudinal direction; and a lifting assembly, configured to drive the driver member to move, to drive the base to move from a starting position to a driven position, the lifting assembly includes a driving wheel that is driven by the power output portion and rotates around a second axis, and a plurality of fitting portions are arranged on a periphery of the driving wheel at intervals; a plurality of engagement holes arranged along the first axis are provided on the driver member; and the plurality of fitting portions are capable of being alternately engaged with the corresponding engagement holes under the action of the driving wheel, to drive the driver member to move along the first axis, so as to drive the base to move from the starting position to the driven position. Therefore, the driver member is more stably engaged with the driving wheel.

In an embodiment, the engagement holes run through the driver member.

In an embodiment, the nail gun further includes a cylinder at least partially arranged in the housing, when the base moves from the starting position to the driven position, gas stored in the cylinder is compressed to implement energy storage.

In an embodiment, the driver member is provided with a driver portion for driving the fastener, a clamping portion, and a connecting portion that is engaged with the base along the first axis in sequence, and the plurality of engagement holes are provided on the clamping portion.

In an embodiment, the driver member has a height extending along the first axis and a width extending in a direction of the second axis, and a width of the clamping portion is greater than a width of the driver portion.

In an embodiment, the driver member has a first side surface and a second side surface in a direction of the second axis, a first side surface of the clamping portion is flush with a first side surface of the driver portion, and a second side surface of the clamping portion protrudes from a second side surface of the driver portion.

In an embodiment, the second axis is perpendicular to the first axis.

In an embodiment, a quantity of the plurality of fitting portions is defined as n, which are sequentially a first fitting portion to an nth fitting portion according to an order of being engaged with the engagement holes, and when the base moves from the starting position to near the driven position, the nth fitting portion is disengaged from the corresponding engagement hole.

In an embodiment, the first fitting portion and the second fitting portion are arranged at a first angle, and a second angle between the $(n-1)^{th}$ fitting portion and the nth fitting portion is not less than the first angle.

In an embodiment, a third angle between the $n^{th}$ fitting portion and the first fitting portion is greater than the second angle.

In an embodiment, radial sizes of the first fitting portion to the $(n-1)^{th}$ fitting portion are equal in a diameter direction of the driving wheel, and a radial size of the $n^{th}$ fitting portion in the diameter direction of the driving wheel is less than the radial size of the first fitting portion.

In an embodiment, the n fitting portions are respectively rotatably supported on the driving wheel through roller sleeves, and a diameter of the roller sleeve of the $n^{th}$ fitting portion is greater than a diameter of the roller sleeve of the first fitting portion. Such arrangement can reduce wear generated on the driver member and the driving wheel during engagement, and ensure the strength of the last engagement portion and the last fitting portion at the moment of the driver member performing nailing.

In an embodiment, at least one of the fitting portions is a rolling portion, the rolling portion is capable of rotating around an axis of the rolling portion on the driving wheel, and the rolling portion is rollably engaged with the engagement hole.

In an embodiment, the power output portion includes a motor and a transmission mechanism, the transmission mechanism includes a transmission member arranged coaxially with the driving wheel and an output wheel meshed with the transmission member, and a rotation axis of the output wheel is perpendicular to a rotation axis of the transmission member. Therefore, a rotation direction outputted from the motor is changed.

In an embodiment, both the driver member and the output wheel are located on a side of the meshing surface on the transmission member, and a rotation axis of the driving wheel is located on a side of the driver member close to the motor. A transverse width of the nail gun is reduced, and the visibility and the accessibility for operating the nail gun are improved.

In an embodiment, engagement portions are arranged on a side of the engagement holes along the first axis, and the fitting portions are capable of being engaged with the engagement portions, to drive the driver member to move in a direction of the first axis. The engagement portions are arranged on the side of the engagement holes, so that when the driving wheel is in contact with the driver member, the engagement portions are engaged with the fitting portions to lift the driver member.

In an embodiment, a direction perpendicular to the first axis and perpendicular to the second axis is defined as a thickness direction of the driver member, the plurality of engagement portions are provided with abutting portions close to a side of the driving wheel and root portions away from the side of the driving wheel in the thickness direction, the plurality of engagement portions further include meshing surfaces and crossing surfaces, the meshing surfaces and the crossing surfaces are respectively located on two sides of the abutting portions along the first axis, and the plurality of engagement portions are engaged with the plurality of fitting portions through the meshing surfaces.

In an embodiment, on a plane perpendicular to the thickness direction, a length of a projection of at least one of the root portions along the first axis is greater than lengths of projections of the abutting portions along the first axis.

In an embodiment, lengths of projections of the root portions of the remaining engagement portions other than a first engagement portion adjacent to the base and a last engagement portion away from the base along the first axis are greater than the lengths of the projections of the abutting portions along the first axis.

In an embodiment, an extending length of at least one of the abutting portions in the direction of the first axis ranges from 0 mm to 1 mm. It is ensured that the engagement portions on the driver member can be normally engaged with the fitting portions on the driving wheel when the driver member is located at an abnormal position, to avoid meshing interference and motor blockage.

In an embodiment, the extending lengths of the remaining engagement portions other than a first engagement portion adjacent to the base and a last engagement portion away from the base range from 0 mm to 1 mm. Because the driver member is not located at engaged positions of the first engagement portion and the last engagement portion when abnormally stopping, lengths of the abutting portions of the remaining engagement portions other than the first engagement portion and the last engagement portion in a direction of a longitudinal axis is less than 1 mm, to ensure the strength of the first engagement portion and the last engagement portion and avoid occurrence of meshing interference.

In an embodiment, in the thickness direction, at least one of the crossing surfaces is gradually close to the meshing surfaces in a direction toward the driving wheel.

In an embodiment, the crossing surfaces of the remaining engagement portions other than a first engagement portion adjacent to the base and a last engagement portion away from the base are gradually close to the meshing surfaces in the direction toward the driving wheel.

In an embodiment, the meshing surface is perpendicular to the first axis, and an angle between the crossing surface and the meshing surface is greater than 15 degrees and less than 75 degrees.

In an embodiment, an arc is formed by the abutting portion, the meshing surface, and the crossing surface of at least one of the engagement portions.

In an embodiment, at least one of the crossing surfaces is a concave arc surface and/or a bevel. The above technical solution is processed and implemented through the arc and/or the bevel, but are not limited to the two implementation forms, and one of the technical problems mentioned in the present embodiment resolved provided that the length of the abutting portion of the engagement portion along the direction of the longitudinal axis of the driver member is less than 1 mm.

In an embodiment, the crossing surfaces of the remaining engagement portions other than a first engagement portion adjacent to the base are concave arc surfaces and/or bevels The strength of the first engagement portion and the last engagement portion is further ensured and occurrence of abnormal meshing is avoided.

In an embodiment, the driving wheel is provided with a first fitting portion engaged with a first engagement portion adjacent to the base, and a distance between an outer edge of the first fitting portion and a rotation center of the driving wheel is not greater than a curvature radius of the crossing surface. Therefore, a probability of occurrence of abnormal meshing is further reduced.

In an embodiment, a distance between a last engagement portion away from the base of the driver member and an axis of the driving wheel in the thickness direction is less than distances between other engagement portions and the axis of the driving wheel in the thickness direction. Such arrangement can promote the normal engagement between the engagement portions on the driver member and the fitting portions on the driving wheel.

In an embodiment, at least one of the fitting portions is a rolling portion, the rolling portion is capable of rotating around an axis of the rolling portion on the driving wheel, the rolling portion is rollably engaged with the engagement portion, and a first rolling portion engaged with a first engagement portion adjacent to the base is in a non-cylindrical shape Therefore, it may be ensured that there is no abnormality in the first engagement between the driver member and the driving wheel in one nailing cycle.

In an embodiment, the first rolling portion is provided with a plurality of bump portions extending outwards in a radial direction, and the plurality of bump portions are uniformly arranged at intervals around an outer surface of the first rolling portion. It may further be ensured that the driver member is smoothly and normally engaged with the driving wheel.

In an embodiment, the first rolling portion is provided with a plurality of inward recessed portions in the radial direction, and a radius of the recessed portion is not greater than an arc radius of the abutting portion. The recessed portions of the first rolling portion and the abutting portions are prevented from being stuck during rotation.

In an embodiment, a pressing plate is arranged above the driver member. Such arrangement can guide the movement of the driver member, improve the strength of the driver member, and prevent the driver member from being deformed during the movement in a first direction and a second direction.

In an embodiment, the pressing plate is provided with a groove for avoiding interfering with the driving wheel, and the pressing plate is fixedly arranged on the muzzle through screws. Because the pressing plate is provided with the groove for avoiding interfering with the driving wheel, the driving wheel can normally rotate to perform lifting. The pressing plate is fixedly connected to a tool, ensuring strength and rigidity of the pressing plate, so that the tool normally and stably performs an operation, improving the operation stability and the use safety of the tool.

In an embodiment, a nail gun is provided, which reduces a transverse width and an overall volume of the entire lifting mechanism while maintaining stable and reliable running of the nail gun, and improves the accessibility and visibility of the nail gun. The nail gun includes: a housing; a magazine, configured to provide fasteners for the nail gun; a driver assembly, at least partially arranged in the housing, where the driver assembly includes a firing pin configured to drive the fastener and a compression plug connected to the firing pin, the firing pin has a longitudinal axis, the compression plug has a starting position close to the fastener and a driven position away from the fastener, and the compression plug and the firing pin can perform a linear reciprocation motion between the starting position and the driven position; an energy storage mechanism, configured to drive the compression plug to move from the driven position to the starting position; and a lifting assembly, including a motor and a transmission mechanism driven by the motor, where the transmission mechanism includes an output wheel driven by the motor, a transmission member driven by the output wheel, and a driving wheel arranged coaxially with the transmission member; when the compression plug is at the starting position, the driving wheel is engaged with the firing pin to drive the compression plug to move to the driven position, and when the compression plug moves to a vicinity of the driven position, the driving wheel is disengaged from the firing pin; and a rotation axis of the output wheel is perpendicular to a rotation axis of the driving wheel, the transmission member is provided with a meshing surface meshed with the output wheel, and both the firing pin and the output wheel are located on a side of the meshing surface on the transmission member.

In the nail gun, in the design of the lifting assembly, the rotation axis of the output wheel is perpendicular to the rotation axis of the driving wheel, so that a rotation direction of the output wheel is orthogonal to a rotation direction of the driving wheel, to change a torque transmission direction of the motor, which is convenient for the driving wheel to be vertically or longitudinally arranged relative to the firing pin. Because both the firing pin and the output wheel are located on the side of the meshing surface on the transmission member, that is, the firing pin and the output wheel are located on the same side, during arrangement of the motor, the motor is allowed to be arranged as close as possible to a lower part of the firing pin in a transverse width of the nail gun, to effectively reduce transverse widths of the driving wheel and the motor in the nail gun, reduce a transverse width and an overall volume of the entire lifting assembly, and help improve the visibility and accessibility of the nail gun. In addition, the driving wheel and the firing pin can drive the compression plug to move to the driven position when being engaged. Therefore, when the compression plug moves to the vicinity of the driven position under the drive of the firing pin, the driving wheel is disengaged from the firing pin, so that the compression plug is rapidly released at the driven position, to stably drive the fastener. Therefore, the nail gun has a simple structure and few parts, and the transverse width of the lifting assembly is reduced while stability and smoothness of the lifting assembly are ensured.

In an embodiment, a distance between an axis of the motor and an axis of the compression plug ranges from 0 mm to 20 mm.

In an embodiment, the rotation axis of the driving wheel is perpendicular to the longitudinal axis.

In an embodiment, the rotation axis of the output wheel is perpendicular to the longitudinal axis.

In an embodiment, the output wheel is a first bevel gear, and the transmission member is a second bevel gear meshed with the first bevel gear.

In an embodiment, an axis of the driving wheel is located on a side of the firing pin close to the motor.

In an embodiment, the motor and the output wheel are coaxially arranged, the magazine is projected in an axis direction of the firing pin, to form a first projection area, the motor and the transmission mechanism are projected in the axis direction of the firing pin, to form a second projection area, and the second projection area covers the first projection area in a width direction of the second projection area.

In an embodiment, a plurality of engagement portions are arranged on the firing pin, the engagement portions are arranged at intervals along the longitudinal axis of the firing pin, a plurality of fitting portions are arranged on the driving wheel, and before the compression plug reaches the driven position, the fitting portions are alternately engaged with the engagement portions in a one-to-one correspondence under the action of rotation of the driving wheel; and when the compression plug moves to the vicinity of the driven position, the fitting portions are disengaged from the engagement portions.

In an embodiment, the firing pin is provided with a plurality of holes in a direction of a longitudinal axis, and the engagement portions are edges of the holes close to the compression plug.

In an embodiment, at least one of the fitting portions is a rolling portion, the rolling portion can rotate around an axis of the rolling portion on the driving wheel, and the rolling portion is rollably engaged with the engagement portion.

In an embodiment, the fitting portions include a first fitting portion and a second fitting portion adjacent to the first fitting portion, a separation portion is arranged between the first fitting portion and the second fitting portion, and when the compression plug reaches the driven position, the first fitting portion is engaged with the engagement portion; and as the driving wheel continues to rotate, the first fitting portion is disengaged from the engagement portion, and the separation portion rotates to be opposite to the firing pin and maintain a distance with the firing pin.

In an embodiment, when the firing pin is located at the starting position, the compression plug is subject to a pre-pressure applied by the energy storage mechanism towards the firing pin.

In an embodiment, a pre-pressure spring is arranged in the energy storage mechanism, and the pre-pressure spring is connected between an inner wall of the energy storage mechanism and the compression plug, so that the compression plug is subject to the pre-pressure.

In an embodiment, when the firing pin is located at the starting position, a preset amount of gas is stored in the energy storage mechanism, so that the compression plug is subject to the pre-pressure.

In an embodiment, the nail gun further includes a storage cylinder, and the storage cylinder is in communication with the energy storage mechanism.

BRIEF DESCRIPTION OF THE DRAWINGS

The accompanying drawings that constitute a part of this application are used to provide a further understanding of the present disclosure. Exemplary embodiments of the present disclosure and descriptions of the embodiments are used to describe the present disclosure, and do not constitute any inappropriate limitation to the present disclosure.

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The following descriptions on the implementations with reference to the accompanying drawings make the above and further features of the present disclosure become clear, and the implementations are merely examples, and in which.

100—nail gun, 110—housing, 120—energy storage mechanism, 130—guide base, 140—compression plug/base, 150—driver member, 151—reference plane, 152—engagementportion, 153—mounting member, 154—longitudinal axis, 39 and 155—engagement hole, 160—lifting assembly, 161—motor, 162—driving wheel, 1621—fitting portion, 16211—first fitting portion, 16212—second fitting portion, 16213—rolling portion, 1622—separation portion, 163—transmission mechanism, 1631—output wheel, 16311—first bevel gear, 1632—transmission member, 16321—second bevel gear, 16322—meshing surface, 1633—rotating shaft, 164—gear box, 165—second projection area, 170—gas storage cylinder, 180—magazine, 181—first projection area, 200—fastener, 190—spring, 191—guide rod, 156—first side surface, 157 and 158—second side surface, 1501—driver portion, 1502—clamping portion, 1503—connecting portion, 1, 10, 11, and 11*a*—driver member, 1-1, 1-2, 10-1, 10-7, 11-1 to 11-6, 11*a*-1, 11*a*-2, and 11*a*-10—engagement portion, 2, 20, 12, and 12*a*—driving wheel, 2-1, 2-2, 20-1, 20-7, 12-1 to 12-6, 12*a*-1, 12*a*-2, and 12*a*-10—fitting portion, 3, 30, 13, and 13*a*—piston/base, 4, 40, and 32—abutting portion, 14—fastener, 15—workpiece, 16—cylinder, 17—head housing, 18—muzzle, 19—depth adjustment mechanism, 21—safety switch contact element, 22—magazine, 23—trigger, 24—reducer casing, 25—control plate, 26—motor, 27—bumper, 28—transmission member, 29—muzzle cover plate assembly, 31—lower cover plate, 33—crossing surface, 34—meshing surface, 35—pressing plate, 36—pressing plate fastener, 37—groove, 38—bearing chamber, 41—output wheel, and 42—root portion.

DETAILED DESCRIPTION

To make the foregoing objects, features and advantages of the present disclosure more comprehensible, detailed description is made to specific implementations of the present disclosure below with reference to the accompanying drawings. In the following description, many specific details are described to give a full understanding of the present disclosure However, the present disclosure may be implemented in many other manners different from those described herein. A person skilled in the art may make similar improvements without departing from the connotation of the present disclosure. Therefore, the present disclosure is not limited to the specific embodiments disclosed below.

Figure 17:
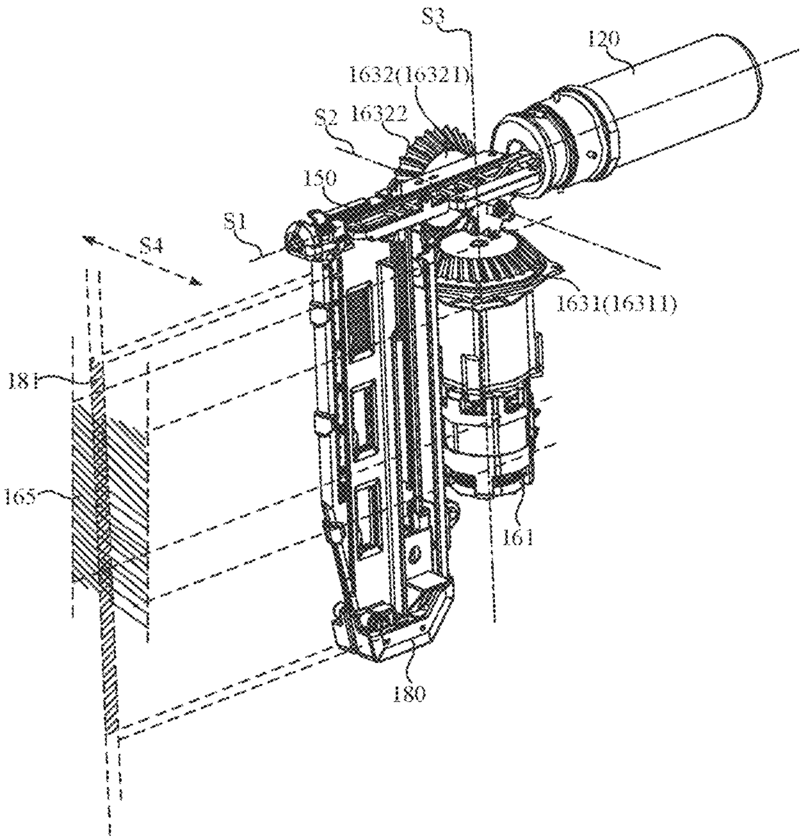
FIG. 17 is a projection view of a projection structure of a nail gun according to an embodiment.

For ease of understanding of "an axis of a base 140", "an axis of a driving wheel 162", and "a rotation axis of an output wheel 1631" in this application, for example, in FIG. 17, the axis of the base 140 is represented by using a line S1 in FIG. 17; the axis of the driving wheel 162 is represented by using a line S2 in FIG. 17; and the rotation axis of the output wheel 1631 is represented by using a ling S3 in FIG. 17.

In an embodiment, referring to FIG. 5, FIG. 7, FIG. 10, and FIG. 18, a nail gun 100 is provided. The nail gun 100 includes: a housing (housing) 110; a magazine (clip) 180, configured to provide a fastener 200 to the nail gun 100; a driver assembly, at least partially arranged in the housing 110, where the driver assembly includes a driver member (firing pin) 150 configured to drive the fastener 200 and a base 140 connected to the driver member 150, the base 140 has a starting position close to the fastener 200 and a driven position away from the fastener 200, and the base 140 and the driver member 150 can perform a linear reciprocation motion between the starting position and the driven position; an energy storage mechanism 120, at least partially arranged in the housing 110 and configured to drive the base 140 to move from the driven position to the starting position, where the energy storage mechanism 120 includes a cylinder 170 provided with a pre-pressure spring or a cylinder 170 provided with high-pressure gas or a spring 190, and the energy storage mechanism 120 is configured to provide a driving force for driving the fastener 200; and a lifting assembly 160, including a motor 161 and a transmission mechanism 163 driven by the motor 161, where the motor 161 and the transmission mechanism 163 are a power output portion, the transmission mechanism 163 includes an output wheel 1631 driven by the motor 161, a transmission member 1632 driven by the output wheel 1631, and a driving wheel 162 arranged coaxially with the transmission member 1632; when the base 140 is at the starting position, the driving wheel 162 is engaged with the driver member 150 to drive the base 140 to move to the driven position, and when the base 140 moves to a vicinity of the driven position, the driving wheel 162 is disengaged from the driver member 150; and the transmission member 1632 is provided with a meshing surface 16322 meshed with the output wheel 1631, a rotation axis of the output wheel 1631 is perpendicular to a rotation axis of the driving wheel 162, and both the driver member 150 and the output wheel 1631 are located on a side of the meshing surface 16322 on the transmission member 1632. Undoubtedly, both an axis of the driver member 150 and an axis of the motor 161 are located at the side of the meshing surface 16322 on the transmission member 1632.

In the nail gun 100, in the design of the lifting assembly 160, the rotation axis of the output wheel 1631 is perpendicular to the rotation axis of the driving wheel 162, so that a rotation direction of the output wheel 1631 is orthogonal to a rotation direction of the driving wheel 162, to change a torque transmission direction of the motor 161, which is convenient for the driving wheel 162 to be vertically or longitudinally arranged relative to the driver member 150. Because both the driver member 150 and the output wheel 1631 are located on the side of the meshing surface 16322 on the transmission member 1632, that is, the driver member 150 such as a driving wheel, and the output wheel 1631 are located on the same side, during arrangement of the motor 161, the motor 161 is allowed to be arranged as close as possible to a lower part of the driver member 150 in a transverse width of the nail gun 100, to effectively reduce transverse widths of the driving wheel 162 and the motor 161 in the nail gun 100, reduce a transverse width and an overall volume of the entire lifting assembly 160, and help improve the visibility and accessibility of the nail gun 100. In addition, the driving wheel 162 and the driver member 150 can drive the base 140 to move to the driven position when being engaged Therefore, when the base 140 moves to the vicinity of the driven position under the drive of the driver member 150, the driving wheel 162 is disengaged from the driver member 150, so that the base 140 is rapidly released at the driven position, to stably drive the fastener 200 Therefore, the nail gun 100 has a simple structure and few parts, and a transverse width of the lifting assembly 160 is reduced while stability and smoothness of the lifting assembly 160 are ensured.

It should be noted that, the driven position should be understood as that the base 140 moves along an axis of the energy storage mechanism 120 under the drive of the driver member 150, to compress gas in the cylinder 170 or compress the spring 190, so as to obtain pressure. After the base 140 moves to a vicinity of a position, the released base 140 obtains instantaneous impact energy, to drive the driver member 150 to drive the fastener 200. In this case, the position where the base 140 is released may be understood as the driven position. The base 140 may be a compression plug, for example, a column plug or a piston, or may be an impact frame, a driver member base, or the like.

"The vicinity of the driven position" should be understood as that when the base 140 moves to the driven position, the driving wheel 162 and the driver member 150 reach a critical point of disengagement. In this case, the driving wheel 162 may be disengaged from the driver member 150. The driving wheel 162 may not be disengaged from the driver member 150 immediately due to a residual force during engagement between the driving wheel and the driver member, or after the driving wheel 162 is engaged with the driver member 150 to lift the driver member 150, the driving wheel 162 continues to rotate and continues to be engaged with the driver member, and then is disengaged from the driver member after causing the driver member 150 to move toward the fastener together with the high pressure in the cylinder 170 or the spring 190. When the base 140 moves to the driven position, and the driving wheel 162 is not disengaged from the driver member 150, the base 140 needs to continue to move slightly beyond the driven position or over the driven position toward the fastener, so that the driving wheel 162 can be exactly disengaged from the driver member 150. A specific value of the vicinity of the driven position may depend on an actual size of the engagement between the driving wheel 162 and the driver member 150. For example, the vicinity is, but not limited to, a value within a range of 0 mm to 5 mm from the driven position.

It should further be noted that the rotation axis of the driving wheel 162 may be located above the driver member 150 or may be located below the driver member 150. In addition, the driver member 150 may be a cylindrical structure or may be a rod structure with a plane. When the driver member 150 is the rod structure with the plane, a side surface of the driver member 150 facing the magazine 180 has at least a reference surface 151. In this case, the rotation axis of the driving wheel 162 is parallel to the reference surface 151 based on the reference surface 151 on the driver member 150, so that the arrangement of the driving wheel 162 is defined as a vertical or longitudinal state.

Figure 1:
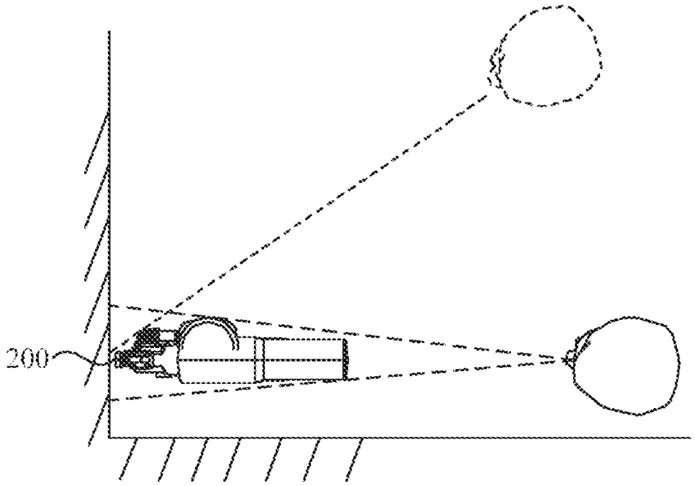
FIG. 1 is a top view of an operator in an existing nail gun.
Figure 2:
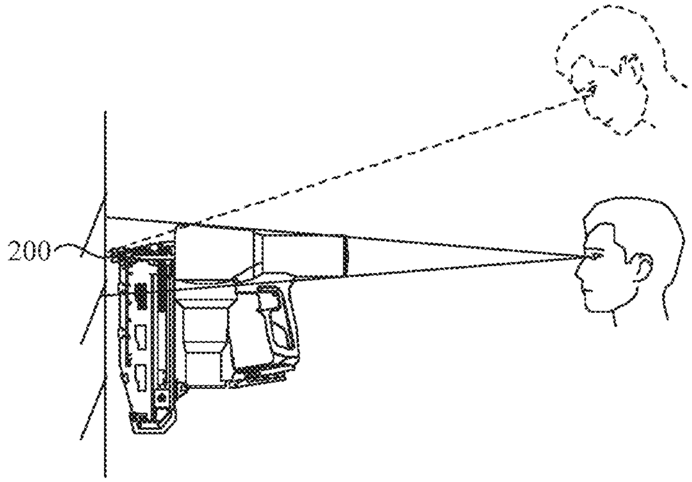
FIG. 2 is a side view of an operator in a conventional nail gun.

In addition, "visibility" and "accessibility" should be respectively understood as that when an operator holds the nail gun 100 to perform an operation, whether a line of sight on a fixed position of the nail gun 100 is blocked by a body of the nail gun 100 is observed from a perspective of the operator, and a blocking degree of the line of sight is used for checking the visibility of the nail gun 100. In terms of the "accessibility", a degree to which the nail gun 100 is affected by an external structure or an external position when acting on the fixed position is investigated. For case of understanding the "visibility", a conventional nail gun 100 is used as an example, referring to FIG. 1 and FIG. 2, due to structural design defects of the conventional nail gun 100, an overall volume of the nail gun 100 is relatively large, and the operator cannot observe the fixed position better regardless of from a side perspective or from a top perspective. As a result, the operator cannot know a nailing state in time, reducing a nailing effect.

Figure 3:
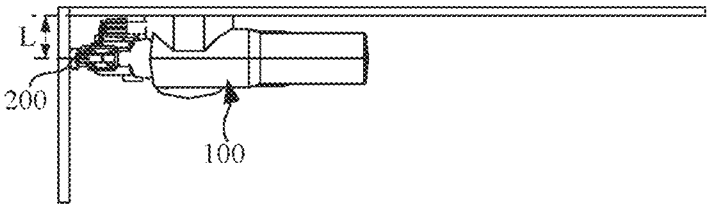
FIG. 3 is a first accessibility analysis diagram of a nail gun according to an embodiment.
Figure 4:
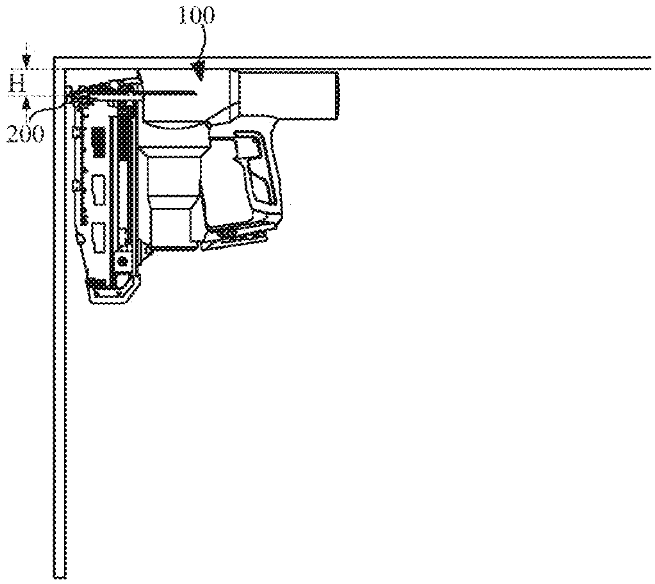
FIG. 4 is a second accessibility analysis diagram of a nail gun according to an embodiment.
Figure 5:
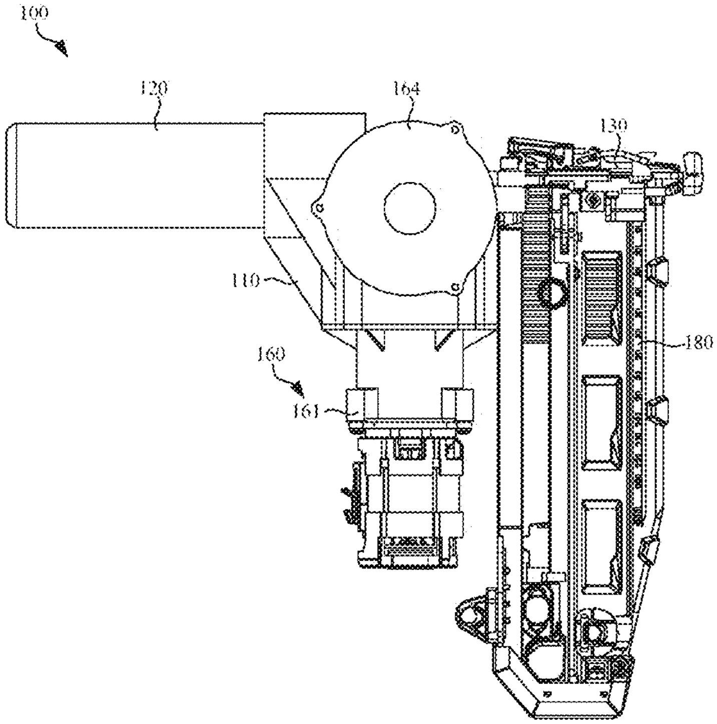
FIG. 5 is a perspective diagram of a nail gun according to an embodiment.

In addition, for case of understanding the "accessibility", FIG. 3 and FIG. 4 are used as an example, the rotation axis of the output wheel 1631 is perpendicular to the rotation axis of the driving wheel 162, and both the driver member 150 and the output wheel 1631 are located on the side of the meshing surface 16322 on the transmission member 1632 Therefore, a distance L between a position where the fastener 200 is driven and a side surface of the housing 110 is less than or equal to 16.4 cm; and a distance H between the position where the fastener 200 is driven and a top surface of the housing 110 is less than or equal to 11.4 cm. Therefore, compared with the conventional nail gun 100, the nail gun 100 can effectively act on a to-be-fixed position adjacent to a corner without being limited by the corner.

Further, referring to FIG. 17, a distance between the axis of the motor 161 and the axis of the base 140 ranges from O mm to 20 mm. Therefore, the distance between the axis of the motor 161 and the axis of the base 140 is reasonably controlled, which is beneficial to reduce a gap between the motor 161 and the base 140, so that the structure of the nail gun 100 becomes more compact, to further improve the visibility and the accessibility of the nail gun 100.

In an embodiment, referring to FIG. 7 and FIG. 17, the driver member 150 has a longitudinal axis 154, and the rotation axis of the driving wheel 162 is perpendicular to the longitudinal axis 154, that is, the axis of the driving wheel 162 is completely arranged above or below the driver member 150 in a transverse state. In this way, the driving wheel 162 can more stably drive the driver member 150 to move.

Further, referring to FIG. 7 and FIG. 17, the axis of the driving wheel 162 is located on a side of the driver member 150 close to the motor 161, that is, both the driving wheel 162 and the motor 161 are located below the driver member 150. Such a design is beneficial to lower the center of gravity of the nail gun 100, so that the operation on the nail gun 100 is more controllable and the man-machine coordination is better.

Figure 7:
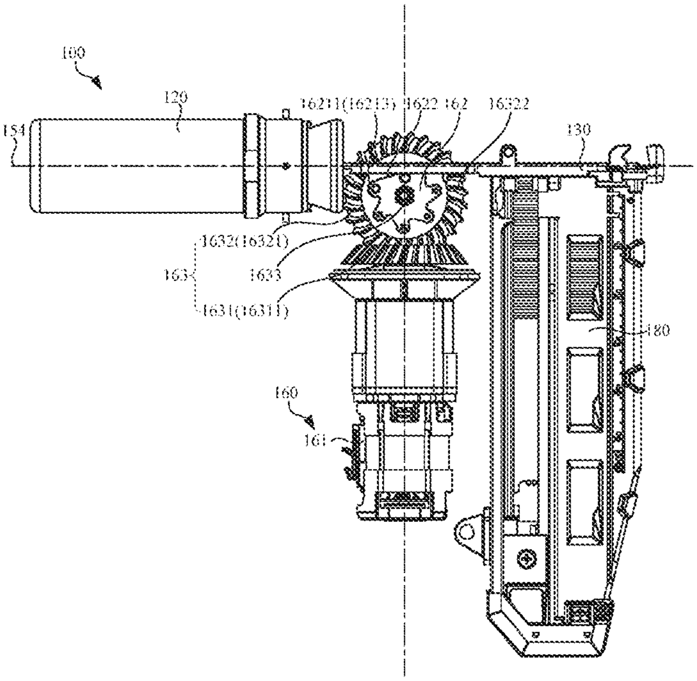
FIG. 7 is a schematic structural diagram of a nail gun after a gear box is hidden according to an embodiment.

In an embodiment, referring to FIG. 7 and FIG. 17, the driver member 150 has a longitudinal axis 154. The rotation axis of the output wheel 1631 is perpendicular to the longitudinal axis 154. In this case, an end surface of the driving wheel 162 is parallel to the rotation axis of the output wheel 1631. If the rotation of the output wheel 1631 is defined as a circular motion in a horizontal direction, the rotation of the driving wheel 162 is a circular motion in a vertical direction.

In an embodiment, referring to FIG. 7, the transmission mechanism 163 further includes a rotating shaft 1633. The rotating shaft 1633 is connected to the driving wheel 162 and the transmission member 1632. It can be learned that during transmission, the motor 161 drives the transmission member 1632 to rotate through the output wheel 1631. After rotation, the transmission member 1632 drives the driving wheel 162 to rotate around the axis of the driving wheel through the rotating shaft 1633, to transmit a rotational force in different directions.

It should be noted that, to transmit the rotational force in different directions, the output wheel 1631 and the transmission member 1632 have at least two structural designs. For example, referring to FIG. 8, first, the output wheel 1631 is a first bevel gear 16311, and the transmission member 1632 is a second bevel gear 16321 meshed with the first bevel gear 16311. In this case, the rotational force on the motor 161 is stably transmitted to the driving wheel 162 by using the two orthogonal bevel gears. Second, the output wheel 1631 is a worm, and the transmission member 1632 is a turbine meshed with the worm. The turbine is connected to the rotating shaft 1633, to drive the driving wheel 162 coaxial with the rotating shaft 1633 to move. That is, transmission between the motor 161 and the driving wheel 162 in different directions is implemented through transmission cooperation between the turbine and the worm.

Figure 6:
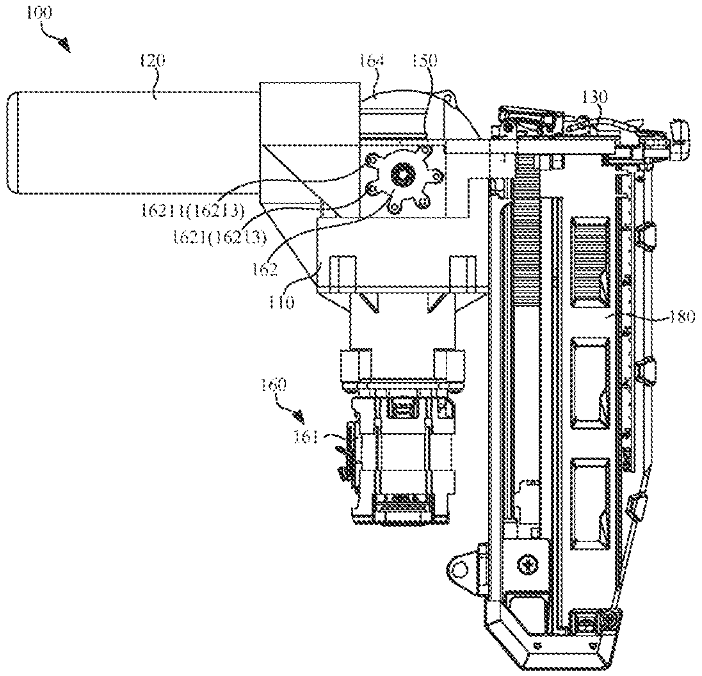
FIG. 6 is another perspective diagram of a nail gun according to an embodiment.
Figure 8:
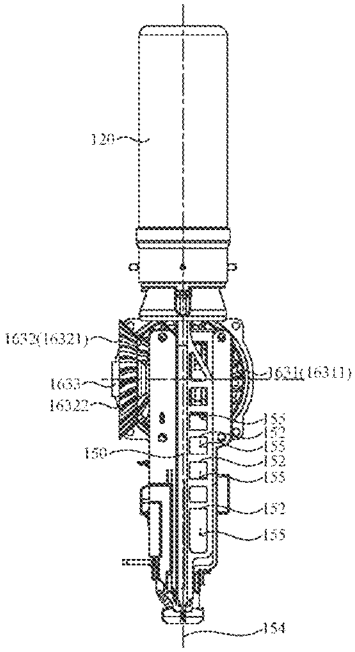
FIG. 8 is a schematic structural diagram of engagement between a lifting assembly and a driver member according to an embodiment.

Specifically, referring to FIG. 8, the output wheel 1631 is the first bevel gear 16311, and the transmission member 1632 is the second bevel gear 16321 meshed with the first bevel gear 16311. In addition, referring to FIG. 6, the lifting assembly 160 further includes a gear box 164 arranged on the housing 110. Both the first bevel gear 16311 and the second bevel gear 16321 are arranged in the gear box 164. The rotating shaft 1633 is rotatably arranged on the gear box 164, and one end of the rotating shaft extends out of the gear box 164 and is connected to the driving wheel 162.

In an embodiment, referring to FIG. 17, the motor 161 and the output wheel 1631 are coaxially arranged. The magazine 180 is projected in an axis direction of the driver member 150, to form a first projection area 181. The motor 161 and the transmission mechanism 163 are projected in the axis direction of the driver member 150, to form a second projection area 165, and the second projection area 165 covers the first projection area 181 in a width direction of the second projection area. It can be learned that the projection of the motor 161 and the transmission mechanism 163 as a whole in the axis direction of the driver member 150 can cover the magazine 180 in the width direction, so that the motor 161 and the magazine 180 are at least arranged side by side in a row in the axis direction of the driver member 150, to avoid increasing of the transverse width of the nail gun 100 due to dislocation of the motor and the magazine. Therefore, the overall volume of the nail gun 100 can further be reduced, and the visibility and the accessibility of the nail gun 100 are improved.

It should be noted that, when a direction of the rotation axis of the output wheel 1631 is perpendicular to the axis direction of the driver member 150, the width direction of the second projection area 165 may be understood as a direction perpendicular to the axis direction of the driver member 150 and perpendicular to the direction of the rotation axis of the output wheel 1631. For case of understanding of the width direction of the second projection area 165, FIG. 17 is used as an example, and the width direction of the second projection area 165 is a direction pointed by any arrow of S4 in FIG. 17.

In addition, in an embodiment, a width of the projection of the motor 161 and the transmission mechanism 163 in the axis direction of the driver member 150 is greater than a width of the projection of the magazine 180 in the axis direction of the driver member 150.

Figure 9:
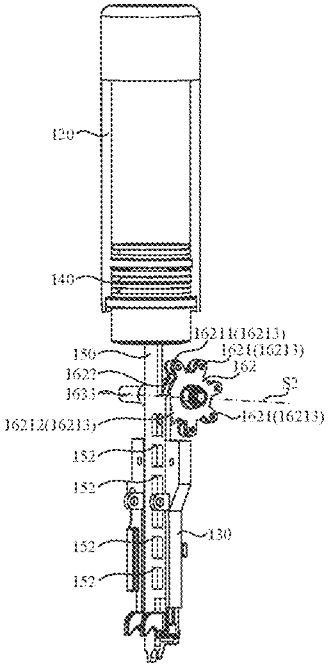
FIG. 9 is a schematic diagram of engagement among an energy storage mechanism, a driving wheel, and a driver member in a starting state according to an embodiment.
Figure 12:
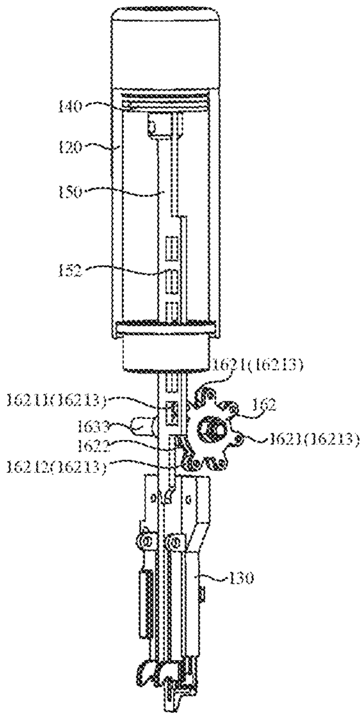
FIG. 12 is a schematic diagram of engagement among an energy storage mechanism, a driving wheel, and a driver member in a driven state according to an embodiment.
Figure 13:
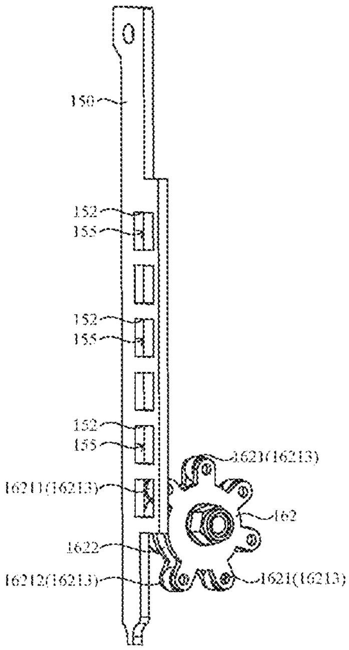
FIG. 13 is a schematic diagram of engagement between a driving wheel and a driver member in a driven state according to an embodiment.

In an embodiment, referring to FIG. 8, a plurality of engagement portions 152 are arranged on the driver member 150. The engagement portions 152 are arranged along the longitudinal axis of the driver member 150 at intervals. A plurality of fitting portions 1621 are arranged on the driving wheel 162. Before the base 140 reaches the driven position, the fitting portions 1621 are alternately engaged with the engagement portions 152 in a one-to-one correspondence under the action of rotation of the driving wheel 162. When the base 140 moves to the vicinity of the driven position, the fitting portions 1621 are disengaged from the engagement portions 152. It can be learned that during working of the nail gun 100, referring to FIG. 9, during rotation, the driving wheel 162 makes the fitting portions 1621 be alternately engaged with the engagement portions 152 at different positions in sequence, to drive the driver member 150 to move along an axis of the energy storage mechanism 120, so that the base 140 moves from the starting position to the vicinity of the driven position. Referring to FIG. 12 and FIG. 13, when the base 140 moves to the vicinity of the driven position, the fitting portions 1621 are disengaged from the engagement portions 152 (it should be understood as that all the fitting portions 1621 are disengaged from the engagement portions 152). In this case, the base 140 is in a released state near the driven position and obtains instantaneous impact energy under the action of the energy storage mechanism 120, to drive the driver member 150 to quickly drive the fastener 200.

It should be noted that, that the fitting portions 1621 are alternately engaged with the engagement portions 152 in a one-to-one correspondence should be understood as that as the driving wheel 162 rotates, the fitting portions 1621 on the driving wheel also rotate. After the former fitting portion 1621 rotates away from the corresponding engagement portion 152, the latter fitting portion 1621 rotates to a position where can be in contact with the driver member 150. In this case, the next engagement portion 152 of the driver member 150 exactly moves to a position where can be engaged with the fitting portion 1621 under the drive of the driving wheel 162, and the cycle is repeated, so that the fitting portions 1621 are alternately engaged with the engagement portions 152 in a one-to-one correspondence.

Specifically, referring to FIG. 8, the plurality of fitting portions 1621 are arranged in a circumferential direction of the driving wheel 162 at intervals.

Figure 16:
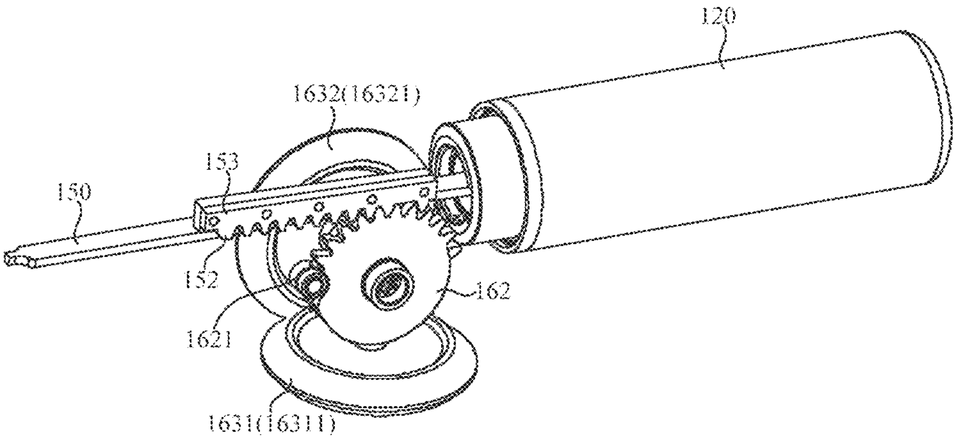
FIG. 16 is a schematic structural diagram of a nail gun with a tooth driving wheel according to an embodiment.

For example, the engagement portion 152 is a convex structure, and the fitting portion 1621 is a groove or hole structure; or the engagement portion 152 is a groove or hole structure, and the fitting portion 1621 is a convex structure. Engagement holes 155 may be through holes or blind holes. When the engagement holes 155 are the through holes, the engagement holes may be considered as a plurality of windows provided on the driver member 150 along a first axis S1 and running through the driver member 150. When the engagement holes 155 are the blind hole, the engagement holes may be understood as a plurality of groove structures provided on the driver member 150 along the first axis S1. Certainly, both the engagement portion 152 and the fitting portion 1621 may alternatively be tooth structures. Referring to FIG. 16, when both the engagement portion 152 and the fitting portion 1621 are the tooth structures, the engagement portion 152 may be directly arranged on the driver member 150 or may be indirectly mounted on the driver member 150. For example, a mounting member 153 is detachably arranged on the driver member 150, and the plurality of engagement portions 152 are arranged on the mounting member 153 at intervals. In addition, the engagement portions 152 are arranged on the detachable mounting member 153, so that a maintenance person can replace the worn mounting member 153, and the structural damage caused by a direct force on the driver member 150 is also avoided.

Figure 11:
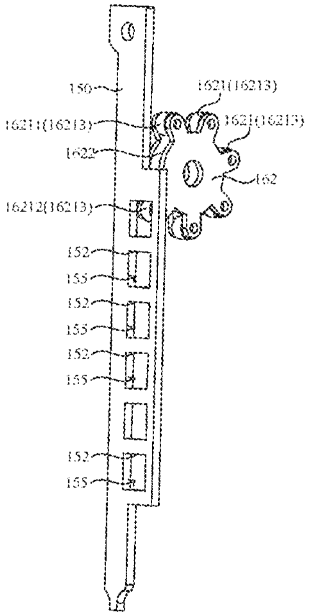
FIG. 11 is a schematic diagram of engagement between a driving wheel and a driver member in a starting state according to an embodiment.

Further, referring to FIG. 11 and FIG. 13, a plurality of engagement holes 155 are provided on the driver member 150 in a direction of the longitudinal axis 154. The engagement portions 152 are edges of the engagement holes 155 close to the base 140 Therefore, during engagement, the fitting portions 1621 are inserted into the engagement holes 155 and are in contact with the edges of the engagement holes 155 close to the base 140, to drive the base 140 to move toward the driven position. There are many alternatives for the shape of the engagement hole 155, for example, the shape of the engagement hole 155 may be, but not limited to, a circle, a square, a pentagon, a hexagon, and the like.

Figure 10:
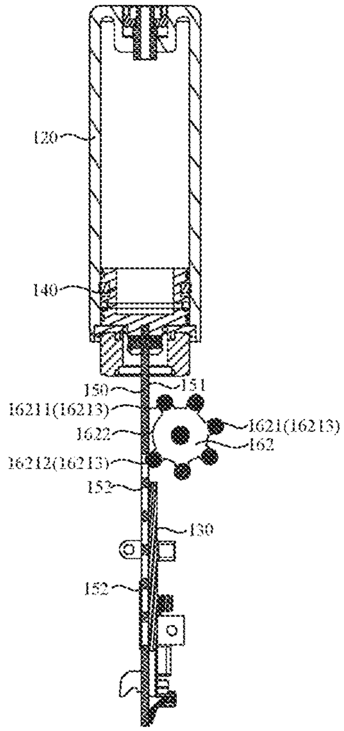
FIG. 10 is a structural cross-sectional view of engagement among an energy storage mechanism, a driving wheel, and a driver member in a starting state according to an embodiment.

In an embodiment, referring to FIG. 8 and FIG. 10, at least one of the fitting portions 1621 is a rolling portion 16213. The rolling portion 16213 can rotate around an axis of the rolling portion on the driving wheel 162, and the rolling portion 16213 is rollably engaged with the engagement portion 152. That is, when the rolling portion 16213 is alternately engaged with the engagement portion 152, friction between the rolling portion 16213 and the engagement portion 152 is rolling friction. In this way, the friction between the rolling portion and the engagement portion can be effectively reduced, and wear between the rolling portion 16213 and the engagement portion 152 is reduced, to prolong the service life of the lifting assembly 160. All or some of the fitting portions 1621 on the driving wheel 162 may be the rolling portions 16213. When some of the fitting portions 1621 are the rolling portions 16213, the fitting portion 1621 that is first engaged with the driver member 150 is designed as the rolling portion 16213.

For example, the rolling portion 16213 may be, but not limited to, a structure such as a roller sleeve, a bearing, a ball, or a roller shaft.

In an embodiment, referring to FIG. 11 and FIG. 13, the fitting portion 1621 includes a first fitting portion 16211 and a second fitting portion 16212 adjacent to the first fitting portion 16211. A separation portion 1622 is arranged between the first fitting portion 16211 and the second fitting portion 16212. When the base 140 reaches the starting position, the first fitting portion 16211 is engaged with the engagement portion 152. As the driving wheel 162 continues to rotate, the first fitting portion 16211 is disengaged from the engagement portion 152, and the separation portion 1622 rotates to be opposite to the driver member 150 and maintains a distance with the driver member. It can be learned that when the base 140 is released at the driven position, the driving wheel 162 rotates, to drive the first fitting portion 16211 to rotate away from the engagement portion 152, so as to be disengaged from the engagement portion. Before the second fitting portion 16212 acts on the driver member 150, the separation portion 1622 is opposite to the driver member 150. Because there is a specific distance between the separation portion 1622 and the driver member 150, the driving wheel 162 does not act on the driver member 150 in this period. Therefore, the base 140 obtains instantaneous impact energy, to drive the driver member 150 to quickly drive the fastener 200, so as to complete a nailing action.

It should be noted that, the separation portion 1622 is arranged between the first fitting portion 16211 and the second fitting portion 16212 for increasing a distance between the first fitting portion 16211 and the second fitting portion 16212, to make a disengagement period exist between the first fitting portion 16211 and the second fitting portion 16212 and the engagement portion 152. A length and a size of the separation portion 1622 may depend on an actual product specification and a distance with the engagement portion 152. In addition, at least one of the first fitting portion 16211 or the second fitting portion 16212 may be the rolling portion 16213. Certainly, during energy storage, because the second fitting portion 16212 is first in contact with the driver member 150, the second fitting portion 16212 can be designed as the rolling portion 16213.

Specifically, referring to FIG. 11, the separation portion 1622 is a curved surface of an outer contour of the driving wheel 162.

In an embodiment, referring to FIG. 10 and FIG. 11, when the driver member 150 completes a driving action on the fastener 200, as the driving wheel 162 rotates, the second fitting portion 16212 is engaged with the engagement portion 152. That is, when the driver member 150 is at the starting position, the driving wheel 162 continues to rotate, and then the separation portion 1622 rotates away from the driver member 150, so that the second fitting portion 16212 rotates to a position where can be in contact with the driver member 150 and is engaged with one engagement portion 152. In this way, the driver member 150 can repeat a periodic action of engagement and disengagement under the action of the driving wheel 162.

In an embodiment, when the driver member 150 is at the starting position, the base 140 has a pre-pressure toward the driver member 150 in the energy storage mechanism 120, and the pre-pressure is applied by the energy storage mechanism 120. This is beneficial to increase the pressure of the base 140 at the driven position and increase a striking force of the driver member 150. In addition, in the starting state, the pre-pressure is increased on the base 140, it can also be ensured that the base 140 is in a tension and stable state, and problems such as looseness and abnormal noise are prevented from occurring when the base 140 and the driver member 150 are at the starting position.

In an embodiment, the nail gun 100 further includes a pre-pressure spring, where the pre-pressure spring is arranged in the energy storage mechanism 120, and the pre-pressure spring is connected between an inner wall of the energy storage mechanism 120 and the base 140, so that the base 140 is subject the pre-pressure. Therefore, the base 140 obtains the pre-pressure in the starting state by using the pre-pressure spring.

In another embodiment, when the driver member 150 completes a striking action on the fastener 200, the energy storage mechanism 120 is filled with a preset amount of gas, so that the base 140 obtains a certain pre-pressure by pre-introducing the preset amount of gas.

In still another embodiment, when the driver member 150 completes a driving action on the fastener 200, the base 140 obtains a certain pre-pressure under a combined action of the pre-pressure spring and a preset amount of gas in the energy storage mechanism 120.

Figure 14:
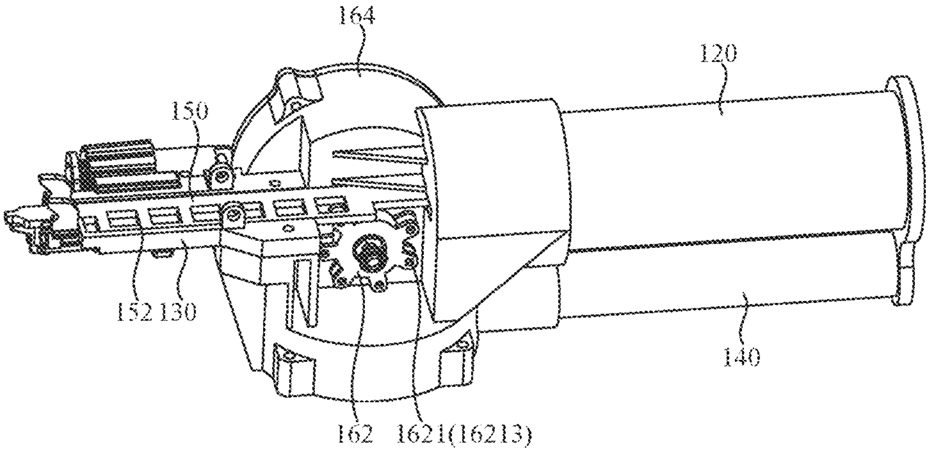
FIG. 14 is a schematic structural diagram of a nail gun provided with cylinders arranged in parallel according to an embodiment.
Figure 15:
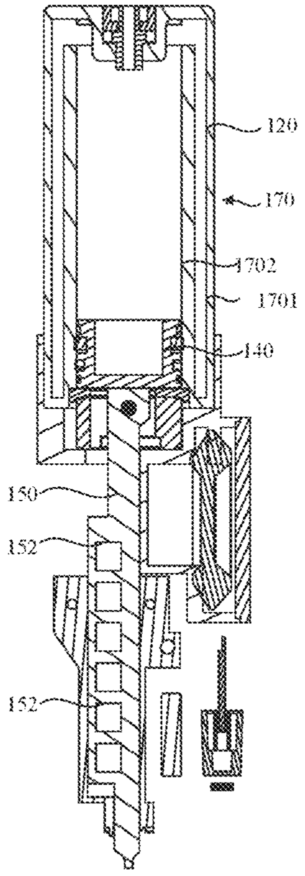
FIG. 15 is a schematic structural diagram of a nail gun provided with cylinder arranged in a form of envelope according to an embodiment.

In an embodiment, referring to FIG. 14 and FIG. 15, the nail gun 100 further includes a cylinder 170. The cylinder 170 is used as a part of the energy storage mechanism 120, and the cylinder 170 is formed by a first cylinder and a second cylinder, so that an amount of high-pressure gas in the nail gun 100 is increased, to improve instant driving strength of the nail gun 100.

It should be noted that, there are a plurality of arrangements for the first cylinder and the second cylinder of the cylinder 170, for example, the first cylinder and the second cylinder are arranged in parallel; the first cylinder and the second cylinder are arranged up and down; or the first cylinder and the second cylinder of the cylinder 170 are in a form of envelope. Referring to FIG. 15, for example, the first cylinder 1701 of the cylinder 170 is sleeved outside the second cylinder 1702, to reduce a space occupied by the cylinder 170.

In an embodiment, the nail gun 100 further includes a muzzle, where the muzzle is connected to the housing 110, to drive the fastener 200 out. In addition, the nail gun 100 further includes a guide base 130, where at least a part of the driver member 150 extends to the guide base 130, to stably drive the fastener 200.

Figure 18:
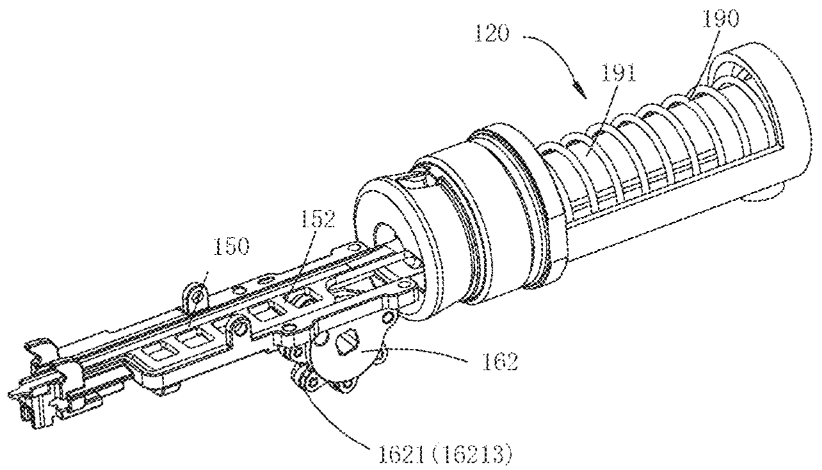
FIG. 18 is a schematic diagram of a starting position of a spring nail gun according to an embodiment.
Figure 19:
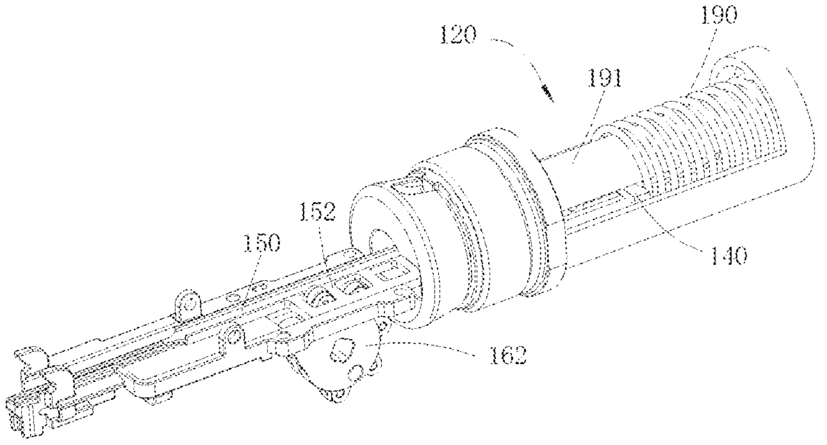
FIG. 19 is a schematic diagram of a driven position of a spring nail gun according to an embodiment.

In another embodiment, referring to FIG. 18 and FIG. 19, the energy storage mechanism 120 includes a spring 190, where a guide rod 191 is arranged in the spring 190, and the guide rod 191 guides a compression direction of the spring 190. One end of the driver member 150 is connected to the base 140, and the base 140 abuts against the spring 190. The plurality of engagement portions 152 are arranged on the driver member 150, and the plurality of fitting portions 1621 are arranged on the driving wheel 162. As shown in FIG. 18, at the starting position, the fitting portions 1621 on the driving wheel 162 are engaged with the engagement portions 152 on the driver member 150. As the driving wheel 162 rotates, the driver member 150 reaches a position shown in FIG. 19. In this case, the spring 190 is compressed, and when the fitting portions 1621 are disengaged from the engagement portions 152, the spring 190 drives the driver member to move from the driven position to the starting position, to provide a striking force for driving the fastener 200.

Figure 20:
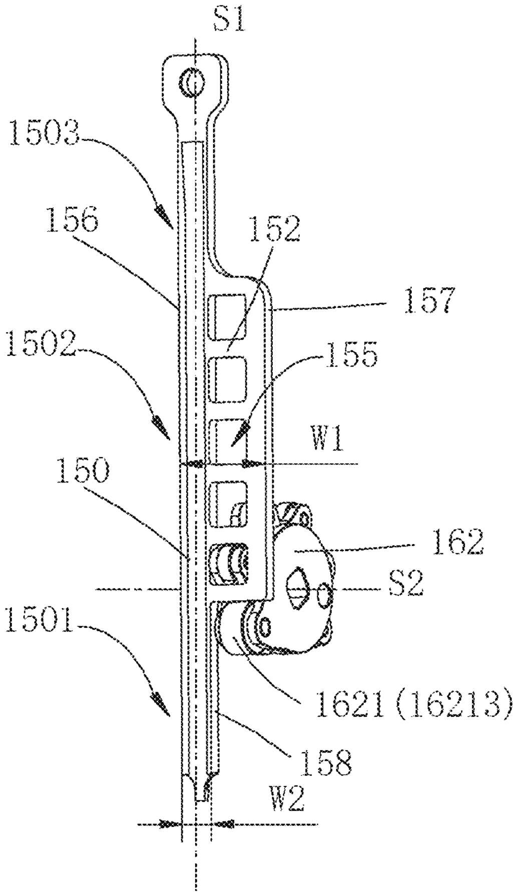
FIG. 20 is a schematic diagram of engagement between a driving wheel and a driver member in a driven state according to another embodiment.

Referring to FIG. 20, a plurality of rolling portions 16213 are arranged on a periphery of the driving wheel 162 at intervals and may rotate around an axis of the rolling portion, and a plurality of engagement holes 155 arranged along the first axis S1 are provided on the driver member 150 and run through the driver member 150. Under the action of the driving wheel 162, the plurality of rolling portions 16213 can alternately be engaged with the corresponding engagement holes 155, to drive the driver member 150 to move along the first axis S1, so as to drive the base 140 to move from the starting position to the driven position.

A direction along the first axis S1 is defined as a height direction of the driver member 150, a direction along a second axis S2 is defined as a width direction of the driver member 150, and the first axis S1 is perpendicular to the second axis S2. A driver portion 1501 for driving the fastener 200, a clamping portion 1502, and a connecting portion 1503 connected to the base 140 are sequentially arranged on the driver member 150 along the first axis S1. The plurality of engagement holes 155 are provided on the clamping portion 1502. A width W1 of the clamping portion 1502 is greater than a width W2 of the driver portion 1501, and a width of the connecting portion 1503 may be consistent with the width of the driver portion 1501. The driver member 150 has a first side surface and a second side surface in a direction of the second axis S2, a first side surface 156 of the clamping portion 1502 is flush with a first side surface of the driver portion 1501, and a second side surface 157 of the clamping portion 1502 protrudes from a second side surface 158 of the driver portion 1501.

The engagement portions 152 are arranged on the top of the engagement holes 155. When the driving wheel 162 rotates, the rolling portions 16213 on the driving wheel 162 can abut against the engagement portions 152 on the engagement holes 155, to drive the driver member 150 to move in the direction of the first axis S1.

Figure 21:
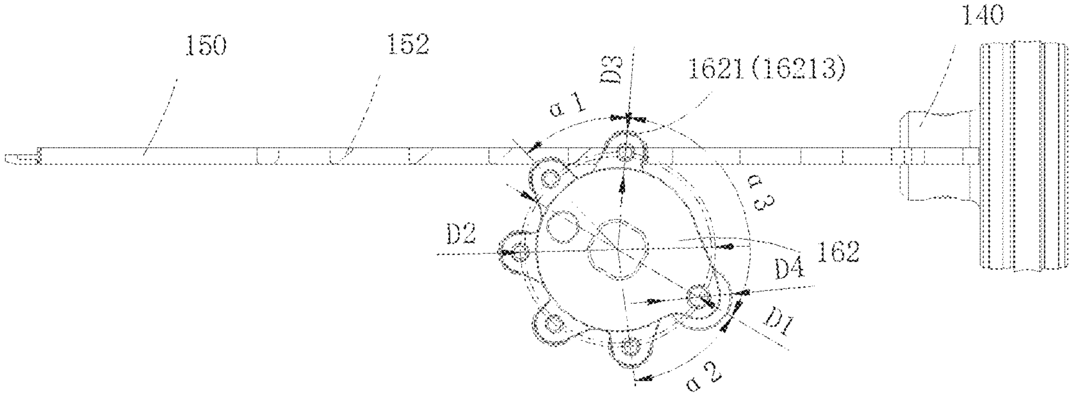
FIG. 21 is a schematic diagram of engagement between a driving wheel and a driver member in a starting state according to another embodiment.

Referring to FIG. 21, there are n rolling portions 16213, which are sequentially a first rolling portion to an nth rolling portion according to an order of being engaged with the engagement holes 155. When the base 140 moves from the starting position to near the driven position, the nth rolling portion is disengaged from the corresponding engagement hole 155. The first rolling portion to the $(n-1)^{th}$ rolling portion are arranged at intervals at a first angle α1, a second angle α2 is provided between the $(n-1)^{th}$ rolling portion and the nth rolling portion, and the second angle α2 is not less than the first angle α1. A third angle α3 between the $n^{th}$ rolling portion and the first rolling portion is greater than the second angle α2.

Radial sizes D2 of the first rolling portion to the $(n-1)^{th}$ rolling portion are equal in a diameter direction of the driving wheel 162, and a radial size D1 of the $n^{th}$ rolling portion in the diameter direction of the driving wheel 162 is not greater than the radial size D2 of the first rolling portion in the diameter direction of the driving wheel 162. The n rolling portions are respectively rotatably supported on the driving wheel 162 through roller sleeves, diameters D3 of the roller sleeve of the first rolling portion to the roller sleeve of the $(n-1)^{th}$ rolling portion are equal, and a diameter D4 of the roller sleeve of the nth fitting portion is greater than the diameter D3 of the roller sleeve of the first rolling portion. Such arrangement makes a force direction of each rolling portion when being engaged with the engagement hole keep basically the same, avoids uneven forces caused by of the enlarging of the roller pin of the $n^{th}$ rolling portion, and makes the lifting process more stable and smooth.

Figure 22:
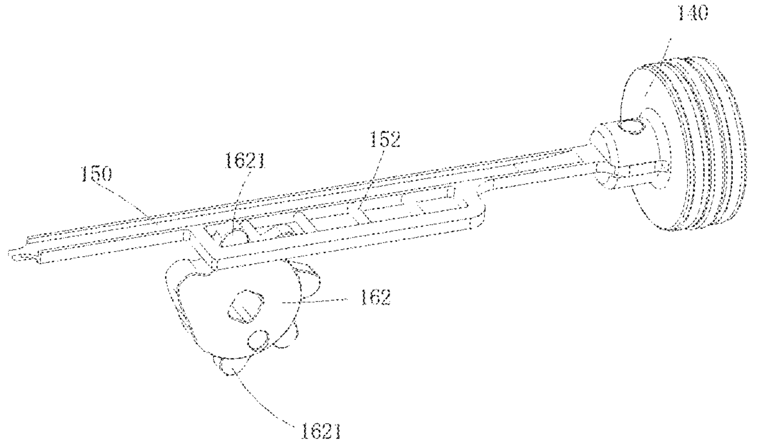
FIG. 22 is a schematic diagram of engagement between a driving wheel and a driver member according to an embodiment.

In an embodiment, referring to FIG. 22, the plurality of fitting portions 1621 are arranged on the driving wheel 162, and the fitting portions 1621 are not the rolling portions Correspondingly, the plurality of engagement portions 152 are arranged on the driver member 150, and the engagement portions 152 are the rolling portions. When the base 140 is at the starting position, the fitting portions 1621 on the driving wheel 162 are engaged with the rolling engagement portions 152 on the driver member 150, to drive the base 140 to move to the driven position. When the base 140 moves to the vicinity of the driven position, the fitting portions 1621 are disengaged from the rolling engagement portions 152, to perform a nailing operation.

Figure 23:
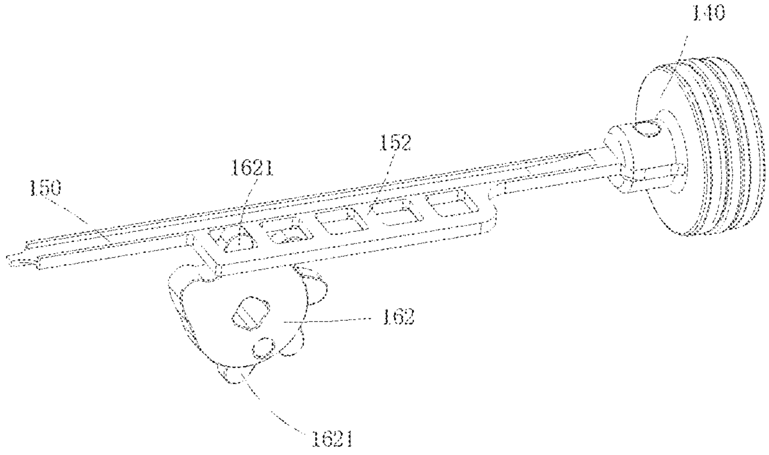
FIG. 23 is a schematic diagram of engagement between a driving wheel and a driver member according to another embodiment.

Referring to FIG. 23, the plurality of fitting portions 1621 are arranged on the driving wheel 162, and the fitting portions 1621 are not the rolling portions. The plurality of engagement portions 152 are arranged on the driver member 150, and the engagement portions 152 are not the rolling portions. Similarly, the driver member 150 can also be lifted, and the driving operation can also be performed on the fastener.

Figure 24:
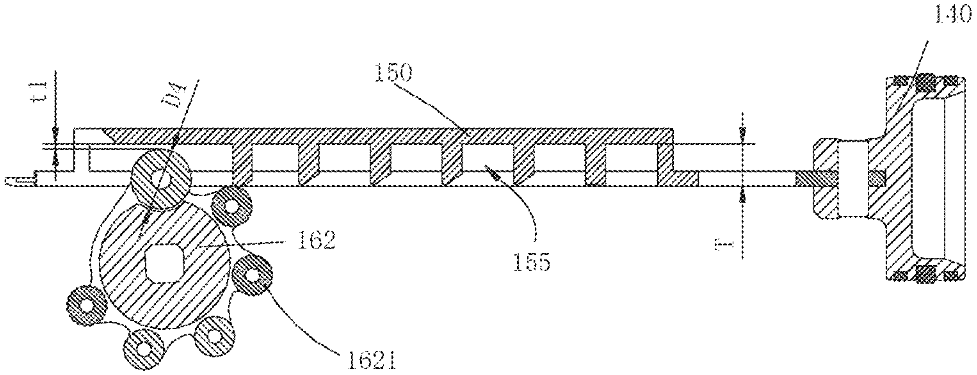
FIG. 24 is a schematic structural diagram in which an engagement hole in a driver member is a blind hole according to an embodiment.

FIG. 24 is a schematic structural diagram in which an engagement hole 155 on a driver member 150 is a blind hole. In a direction shown in the figure, a depth T of the blind hole is greater than 0.75*D4, D4 is a diameter of the $n^{th}$ fitting portion 1621 of the driving wheel 162, and the nth fitting portion 1621 is the largest fitting portion, or when the nth fitting portion 1621 is closest to the top of the blind hole of the driver member 150, a distance t1 between the $n^{th}$ fitting portion and the top of the blind hole is less than 0.5 mm.

Figure 25:
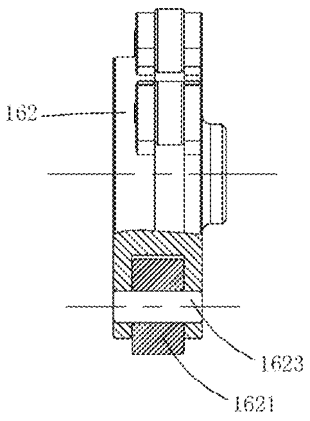
FIG. 25 is a cross-sectional view of a single fitting portion on a driving wheel according to an embodiment.

FIG. 25 is a cross-sectional view of a single fitting portion 1621 on a driving wheel 162 The fitting portion 1621 is a roller sleeve. A roller pin 1623 is fixedly connected to the roller sleeve 1621, and the roller pin and the roller sleeve may be rotatably mounted on a body of the driving wheel 162, or the roller pin 1623 is fixedly connected to a body of the driving wheel 162, and the roller sleeve 1621 may be rotatably mounted on the roller pin 1623.

Figure 26:
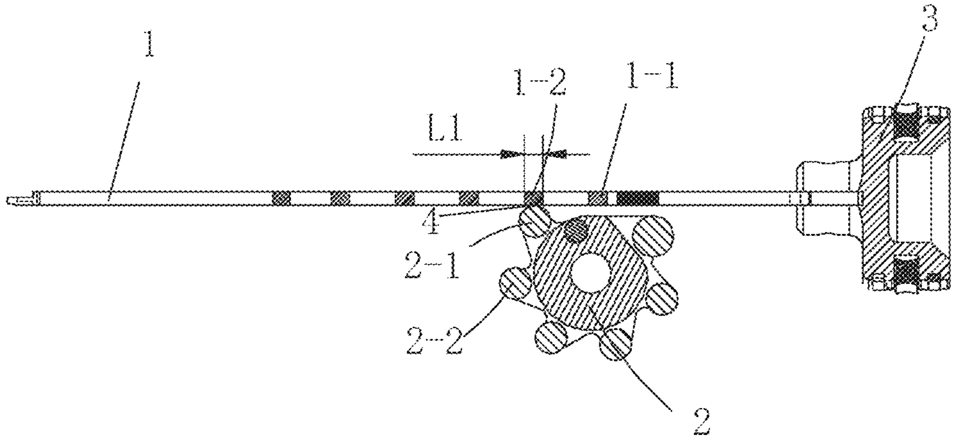
FIG. 26 is a cross-sectional view of a lifting structure of a driver member of a nail gun in an embodiment.
Figure 27:
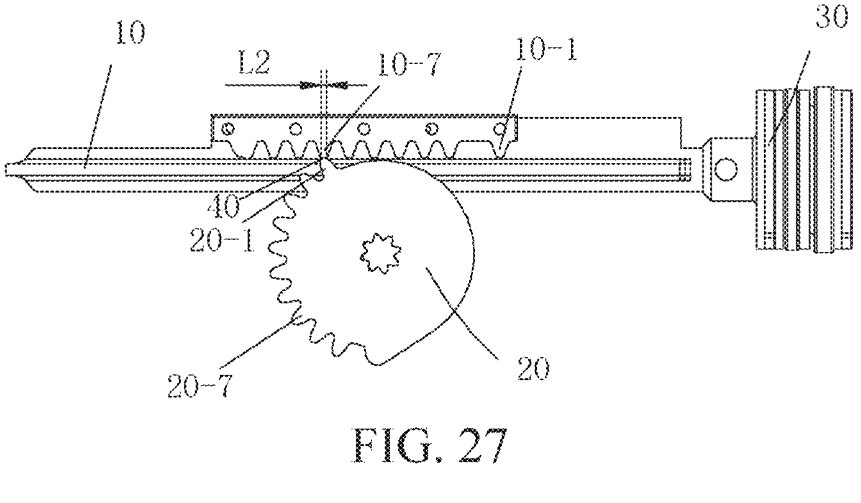
FIG. 27 is a schematic diagram of a gear-and-rack lifting structure of a driver member of another nail gun in an embodiment.

For a normal lifting stroke of the similar gear-and-rack lifting assembly, the driver member and the driving wheel are in a normal meshing relationship. When an abnormal case such as a jam of a fastener occurs, nails block in front of the driver member due to deformation, the driver member cannot stop at a predetermined meshing position, and a dislocation relationship exists between the driver member and the driving wheel (as shown in FIG. 26 and FIG. 27). As a result, similar teeth on the driver member forcibly abut against similar teeth on the driving wheel during meshing, resulting in an excessively large load of the driving wheel and occurrence of overcurrent protection or burnout of a motor, which affect normal working of the tool. In addition, when the jammed nails are removed, because the driver member stops at an abnormal position, there is a potential safety risk during removal of the jammed fasteners.

FIG. 26 is a lifting structure of a driver member of a nail gun in an embodiment. A driver member 1 is connected to a piston 3, a plurality of engagement portions 1-1, 1-2, and the like are arranged on the driver member 1, and a plurality of fitting portions 2-1, 2-2, and the like are arranged on a driving wheel 2. The engagement portions on the driver member 1 are engaged with the fitting portions on the driving wheel 2, and the driving wheel 2 rotates to drive the driver member 1 to lift. The engagement portion is provided with an abutting portion 4 close to the driving wheel, and a length of the abutting portion 4 in a direction of a longitudinal axis of the driver member 1 is L1, and L1 is greater than 1 mm. When a jam of the fastener or another abnormal case occurs, the driver member 1 cannot completely move to a nailing state, that is, the driver member 1 cannot move to a limiting position. In this case, the engagement portion 1-1 cannot be engaged with the fitting portion 2-1. Because L1 is relatively large, the fitting portion 2-1 forcibly abuts against the engagement portion 1-2, resulting in an excessively large load of the driving wheel 2 and occurrence of overcurrent protection occurs or burnout of the motor which affects normal working of the tool. In addition, when the jammed fastener is cleared, it is very likely to cause a phenomenon that the driver member 1 suddenly drives the fastener out due to pressure accumulation of a nailing force, resulting in a safety risk.

FIG. 27 is a lifting structure of a driver member of another nail gun in an embodiment A driver member 10 is connected to a piston 30, a plurality of engagement portions 10-1, 10-7, and the like are arranged on the driver member 10, and a plurality of fitting portions 20-1, 20-7, and the like are arranged on a driving wheel 20. The engagement portions on the driver member 10 are engaged with the fitting portions on the driving wheel 20, and the driving wheel 20 rotates to drive the driver member 10 to lift. The engagement portion is provided with an abutting portion 40 close to the driving wheel, and a length of the abutting portion 40 in a direction of a longitudinal axis of the driver member is L2 and L2 is greater than 1 mm. When a jam of the fastener or another abnormal case occurs, the undesirable phenomena also occur, which affects the normal operation of the tool.

Figure 28:
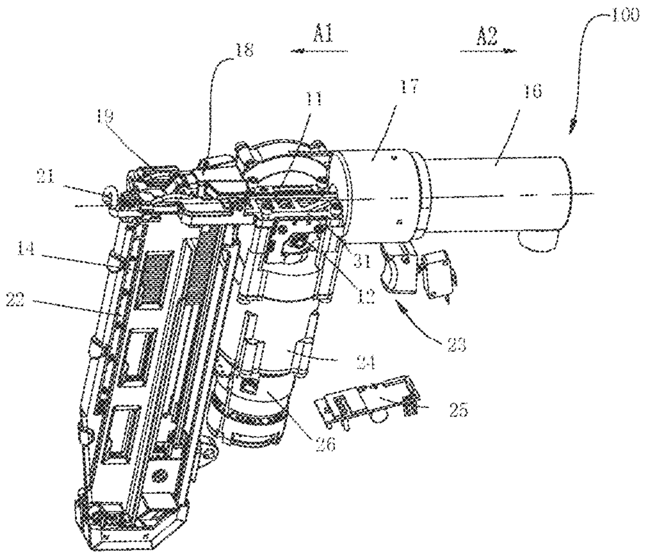
FIG. 28 is a schematic structural diagram of a nail gun in which components such as a housing are hidden according to an embodiment of the present disclosure.
Figure 29:
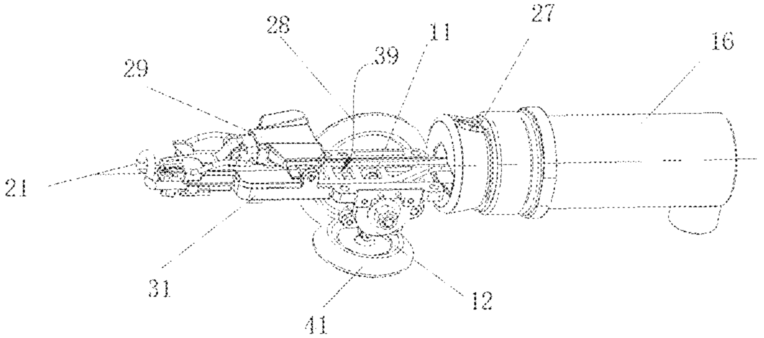
FIG. 29 is a schematic diagram of engagement between a driving wheel and a driver member in a starting state.
Figure 30:
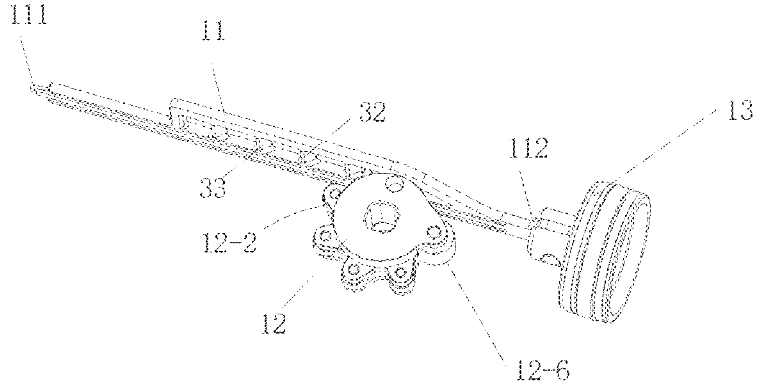
FIG. 30 is a schematic diagram of engagement between a driving wheel and a driver member from another perspective.

In an embodiment, this application provides a driving tool, and in particular, to a nail gun. Referring to FIG. 28 to FIG. 30, a nail gun 100 is provided, including: a housing (not shown in the figure); and a magazine 22, configured to provide a fastener 14, where the fastener 14 may be placed in the magazine 22 in a form of strip nail, or the fastener 14 may exist in a form of coil nail. The magazine 22 may be in different forms of a clip, a tank, and the like according to a size of the fastener 14, and the fastener 14 in the magazine 22 may be pushed to a muzzle 18 by using a nail pushing mechanism, where the nail pushing mechanism may be formed by a component such as a spring or a coil spring. The muzzle 18 is configured to receive a fastener to be driven, and the muzzle 18 is formed by a muzzle cover plate component 29 and a lower cover plate 31. When a jam of a nail occurs, the jammed fastener can be cleared by quickly removing the muzzle cover plate. A safety switch contact element 21 and a depth adjustment mechanism 19 are arranged near the muzzle 18, and the safety switch contact element 21 and a trigger 23 jointly control starting of the nail gun. When a user presses the trigger 23 and the safety switch contact element 21 abuts against a workpiece and is pressed down, the tool is started, to perform nailing. The depth adjustment mechanism 19 may adjust a nailing depth. Power may be provided to the nail gun 100 by a battery pack (not shown in the figure) or may be provided by an alternating current, and electronic control is implemented by a control board 25.

The nail gun 100 further includes a motor (motor) 26 accommodated in the housing configured to output a rotational power. The power of the motor 26 is outputted by using a transmission mechanism, where the transmission mechanism includes a speed reduction mechanism, a driving wheel 12, and the like. After the rotational power is outputted from the motor, speed reduction is performed by using a reducer 24, rotation reversing is implemented by using a transmission member (bevel gear) 28 arranged in the gear box, and finally the power is outputted by using the driving wheel 12 coaxially arranged with the transmission member 28. Reversing of the transmission mechanism may be implemented by using another mechanism rather than the bevel gear, or reversing is not performed, provided that from power output of the motor 26 to power transmission of the driving wheel 12 are completed, which are all one of the embodiments of the present disclosure.

The transmission mechanism includes the transmission member 28 arranged coaxially with the driving wheel 12 and an output wheel 41 meshed with the transmission member 28, where a rotation axis of the output wheel 41 is perpendicular to a rotation axis of the transmission member 28, both a driver member 11 and the output wheel 41 are located on a side of the meshing surface on the transmission member 28, and a rotation axis of the driving wheel 12 is located on a side of the driver member 11 close to the motor 26. Therefore, a transverse width of the nail gun is reduced, and the visibility and the accessibility for operating the nail gun are improved.

Referring to FIG. 30, the nail gun 100 further includes the driver member (firing pin) 11, where the driver member 11 has a longitudinal axis and can move in a first direction A1 and a second direction A2 opposite to the first direction A1, the driver member 11 has a bottom-dead-center position where the driver member moves in the first direction A1 to the limit and a top-dead-center position where the driver member moves in the second direction A2 to the limit, the driver member 11 moves in the first direction A1 to drive a fastener to be driven located in the muzzle 18, and when the driving wheel 12 is engaged with the driver member 11, the driver member 11 may be driven to move in the second direction A2, to store energy The driver member 11 includes a first end 111 close to the muzzle 18 and a second end 112 away from the muzzle 18 and connected to the piston 13. The piston 13 is a form of the base, and the piston 13 is located in a cylinder 16 and synchronously moves with the driver member 11. In a starting state, the cylinder 16 is filled with high-pressure gas and always applies a tendency force to the driver member 11 to drive the driver member to move in the first direction A1, where the tendency force may drive the driver member 11 to move in the first direction A1, to drive the fastener. A bumper 27 is arranged in a head housing 17 of the nail gun 100. When the driver member 11 moves in the first direction A1 to perform nailing, the bumper 27 may absorb a part of kinetic energy of the driver member 11, to achieve buffering and shock absorption. The second end 112 of the driver member 11 may alternatively not be connected to the piston 13 but connected to a plunger or connected to a block, and the cylinder 16 may alternatively be replaced by a mechanical spring.

Figure 31:
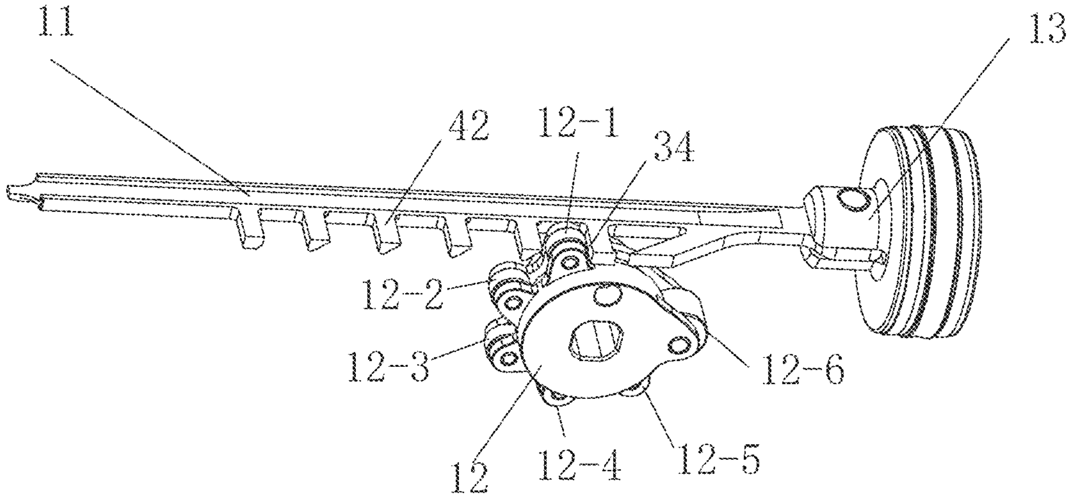
FIG. 31 is a partial cross-sectional view of engagement between a driving wheel and a driver member.
Figure 32:
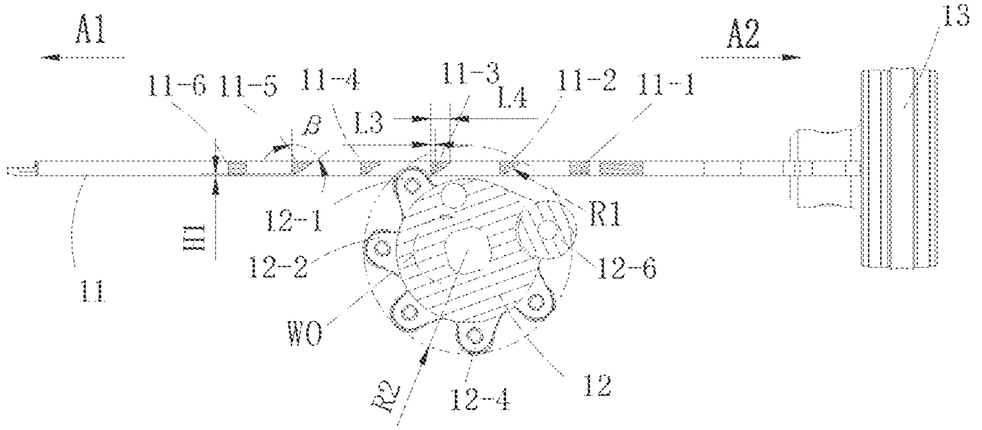
FIG. 32 is a cross-sectional view of abnormal engagement between a driving wheel and a driver member when a fastener is in a jammed state.
Figure 33A:
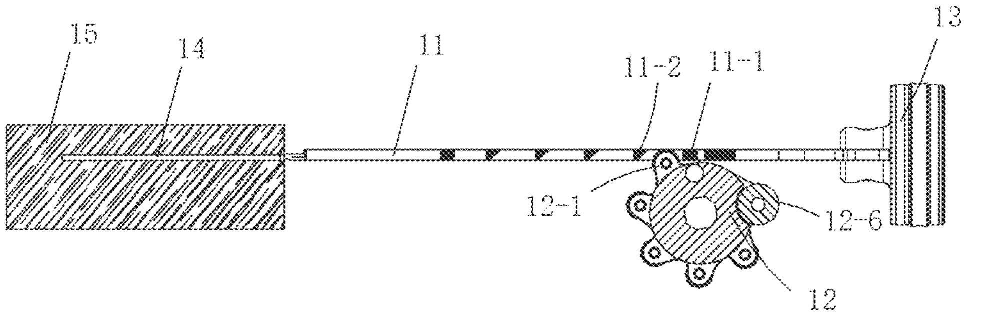
In FIG. 33, (A) is a cross-section view of normal engagement between a driving wheel and a driver member, and (B), (C), and (D) are cross-sectional views of engagement between a driving wheel and a driver member when a fastener is jammed to different degrees.
Figure 33B:
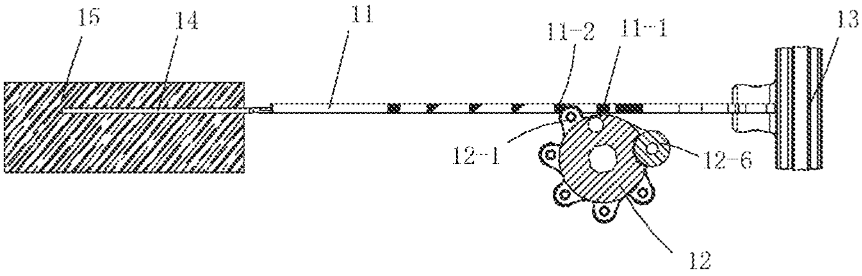
Figure 33C:
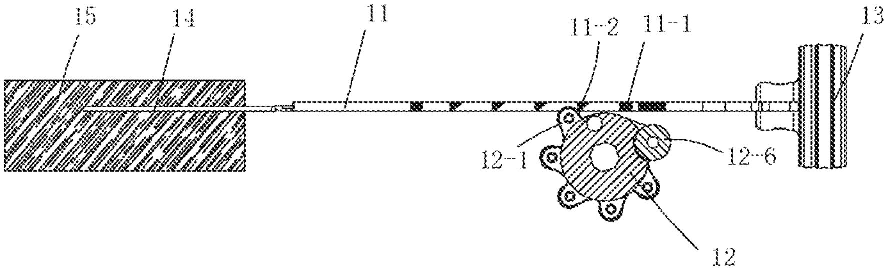
Figure 33D:
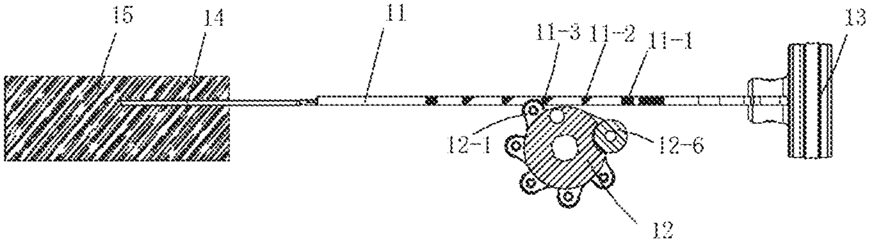

Referring to FIG. 30 to FIG. 32, a plurality of engagement portions 11-1 to 11-6 are arranged on the driver member 11, and a plurality of fitting portions 12-1 to 12-6 are arranged on the driving wheel 12. A quantity of engagement portions and a quantity of fitting portions are not limited to 6, and the quantity of engagement portions and the quantity of fitting portions are in a multiple relationship or an incomplete correspondence. When the fitting portions on the driving wheel 12 are engaged with the engagement portions on the driver member 11, under the action of rotation of the driving wheel 12, the driver member 11 may be driven to move in the second direction A2, and the fitting portions are alternately engaged with the engagement portions in a one-to-one correspondence. In a normal state, the fitting portion 12-1 is engaged with the engagement portion 11-1, the fitting portion 12-2 is engaged with the engagement portion 11-2, and so on. After the fitting portion 12-6 is engaged with the engagement portion 11-6, the driving wheel 12 continues to rotate. Because no fitting portion is engaged with the engagement portion, under the action of a high pressure or a spring force, the driver member 11 may move in the first direction A1 to perform nailing FIG. 32 is a cross-sectional view of abnormal engagement between a driving wheel and a driver member when a fastener is in a jammed state. In this case, the fitting portion 12-1 is engaged with the engagement portion 11-3, the fitting portion 12-2 is engaged with the engagement portion 11-4, and so on. After the fitting portion 12-4 is engaged with the engagement portion 11-6, the fitting portions 12-5 and 12-6 continue to be engaged with the engagement portion 11-6, that is, completion of the engagement between the fitting portion 12-6 and the engagement portion 11-6 is always a prerequisite for the movement of the driver member 11 in the first direction A1.

A direction perpendicular to the first axis S1 and perpendicular to the second axis S2 is defined as a thickness direction of the driver member 11, the plurality of engagement portions 11-1 to 11-6 are provided with abutting portions 32 close to a side of the driving wheel 12 and root portions 42 away from the side of the driving wheel 12 in the thickness direction, the plurality of engagement portions 11-1 to 11-6 further include meshing surfaces 34 and crossing surfaces 33, the meshing surfaces 34 and the crossing surfaces 33 are respectively located on two sides of the abutting portions 32 along the first axis S1, and the plurality of engagement portions 11-1 to 11-6 are engaged with the plurality of fitting portions 12-1 to 12-6 through the meshing surfaces 34. On a plane perpendicular to the thickness direction, a length L4 of a projection of at least one of the root portions 42 along the first axis S1 is greater than lengths L3 of projections of the abutting portions 32 along the first axis S1. In one of embodiments, Lengths L4 of projections of the root portions 42 of the remaining engagement portions 11-2 to 11-5 other than a first engagement portion 11-1 adjacent to the piston/base 13 and a last engagement portion 11-6 away from the piston/base 13 along the first axis S1 are greater than the lengths L3 of the projections of the abutting portions 32 along the first axis S1.

Alternatively, the engagement portions on the driver member 11 are provided with abutting portions 32 close to the driving wheel 12, meshing surfaces 34 engaged with the fitting portions on the driving wheel 12, and crossing surfaces 33 opposite to the meshing surfaces 34. When the fitting portions are engaged with the engagement portions, the abutting portions 32 are initial abutting ends (a clamping position or an easily interfered position) closest to the fitting portions on the driving wheel 12, and the initial abutting end is possibly in contact with the first fitting portion 12-1 An extending length L3 of at least one of the abutting portions 32 in a direction of the longitudinal axis of the driver member 11 ranges from 0 mm to 1 mm, which may be between 0 mm and 0.5 mm, in one embodiment, which is between 0 mm and 0.25 mm, and in other embodiment, which is 0 mm. In this way, when a jam of a fastener occurs, the engagement between the fitting portions and the engagement portion is not interfered.

FIG. 33 (A) is a normal meshing state between a fitting portion and an engagement portion during normal nailing. In this case, the fastener 14 is completely nailed into a workpiece 15. However, during actual nailing, due to an uneven texture of a workpiece, sudden presence of a hard block in a workpiece, or excessively high hardness of a workpiece, a fastener driven into the workpiece is jammed to different degrees. A lifted state when a nail is not completely driven is shown in FIGS. 33 (B), (C), and (D). In this case, after nailing is completed, fasteners 14 of different lengths are exposed to a surface of the workpiece 15. Consequently, the driver member 11 does not move in place. In this case, the driver member is lifted, the fitting portions are abnormally engaged with the engagement portions, and a length of the fastener 14 exposed to the surface of the workpiece 15 is relative short in FIG. 33 (B), and a probability of occurrence of this case is large. Because L3 is relatively small, the fitting portion 12-1 on the driving wheel 12 easily crosses the abutting portion 32 of the engagement portion 11-2 on the driver member 11 and is engaged with the engagement portion 11-1. In this case, the driver member 11 is already close to the bottom-dead-center position, so that the risk is relatively small. In FIG. 33 (C), the fitting portion 12-1 on the driving wheel 12 is engaged with the engagement portion 11-2 on the driver member 11. Similarly, displacement engagement between the fitting portion and the engagement portion can also be completed, to smoothly lift the driver member 11. In FIG. 33 (D), a length of the fastener 14 exposed to the surface of the workpiece 15 is relatively long, and a probability of occurrence of this case is small. However, in this case, the driver member 11 is relatively far away from the bottom-dead-center position, and the driver member 11 is subject to a relatively large pressure moving in the first direction A1. If the fitting portion cannot be engaged with the engagement portion in place, the driver member 11 cannot be smoothly lifted, and it is very dangerous if the jammed nail is removed, and a potential safety hazard exists. Therefore, the risk is high. By designing a relatively small L3, during occurrence of the abnormal case, the fitting portions can be normally engaged with the engagement portions, so that the driver member 11 can be smoothly lifted, to avoid occurrence of the potential safety hazards of blockage of the stuck motor and clearing the nails.

Because a jam of a fastener occurs in the lifting process, the fitting portion 12-1 on the driving wheel 12 does not stop at the first engagement portion 11-1 adjacent to the piston 13 and the last engagement portion 11-6 away from the piston 13. Therefore, extending lengths of the abutting portions 32 of the remaining engagement portions other than the first engagement portion 11-1 adjacent to the piston 13 and the last engagement portion 11-6 away from the piston 13 in the direction of the longitudinal axis of the driver member 11 range from 0 mm to 1 mm, which may be between 0 mm and 0.5 mm, in one embodiment, which is between 0 mm and 0.25 mm, and in other embodiments, which is 0 mm. According to different jammed positions, several main engagement portions affecting the engagement between the fitting portions and the engagement portions may be selected to be set in this way.

Alternatively, in the thickness direction, at least one of the crossing surfaces 33 is gradually close to the meshing surfaces 34 in a direction toward the driving wheel 12. The meshing surface 34 is perpendicular to the first axis S1, an angle between the crossing surface 33 and the meshing surface 34 is greater than 15 degrees and less than 75 degrees, which may be 30 degrees to 75 degrees, in one embodiment, which is 45 degrees to 75 degrees, and in other embodiments, which is about 54 degrees.

It should be noted that, to make L3 within an appropriate range, the crossing surface 33 in the engagement portion on the driver member 11 may be processed, so that the crossing surface 33 is a concave arc surface and/or a bevel, and the crossing surface 33 has a curvature radius R1. In one embodiment, the crossing surfaces 33 of the remaining engagement portions other than the first engagement portion 11-1 adjacent to the piston 13 are concave arc surfaces and/or bevels; the crossing surfaces 33 of the remaining engagement portions other than the first engagement portion 11-1 adjacent to the piston 13 and the last engagement portion 11-6 away from the piston 13 are concave arc surfaces and/or bevels; or several main engagement portions affecting the engagement between the fitting portions and the engagement portions may be selected to be set in this way. In addition, the crossing surface 33 may be formed in another form of combined sectioning in addition to arc processing and/or bevel cutting. When the crossing surface 33 is a concave arc surface, the crossing surface 33 has an arc radius R1 and is right opposite to an end surface of the driving wheel 12. A distance between an outermost edge of the first fitting portion 12-1 on the driving wheel 12 and a rotation center of the driving wheel 12 is R2, and R2≤R1, so that the engagement portion can achieve more effective avoidance through a structure such as an arc, and a probability of occurrence of interference and abnormal meshing between the fitting portion and the engagement portion during a jam of a nail is further reduced.

Referring to FIG. 29, a plurality of engagement holes 39 arranged in the first direction A1 are provided on the driver member 11 and run through the driver member 11. Under the action of the driving wheel 12, the plurality of fitting portions can alternately be engaged with the corresponding engagement holes 39, to drive the driver member 11 to move in the second direction A2. The engagement portions are arranged on a side of the engagement holes 39 in the second direction A2, and the fitting portions can abut against the engagement portions, to drive the driver member 11 to move in the second direction A2.

As shown in FIG. 32, the plurality of engagement portions protrude from a main body of the driver member 11 in a direction intersecting the longitudinal axis, and are arranged at intervals along the longitudinal axis, and the protrusion amounts of the engagement portions are different. A direction perpendicular to the longitudinal axis and perpendicular to the rotation axis of the driving wheel 12 is defined as a thickness direction of the driver member 11. In the thickness direction, other engagement portions on the driver member 11 away from the muzzle 18 are higher than the last engagement portion 11-6 away from the piston 13, that is, thicknesses of the other engagement portions away from the muzzle 18 are less than a thickness of the last engagement portion 11-6 away from the piston 13. That is, there is H1, and H1 is not less than 0.2 mm, in one embodiment, not less than 0.3 mm. In addition, H1 of each engagement portion may be the same or may be different. Alternatively, a distance between the last engagement portion 11-6 on the driver member 11 away from the piston 13 and the axis S2 of the driving wheel in the thickness direction is less than distances between other engagement portions 11-1 to 11-5 and the axis S2 of the driving wheel, that is, in the thickness direction, the other engagement portions 11-1 to 11-5 are farther away from the driving wheel than the last engagement portion 11-6. Therefore, the interference between the fitting portion and the engagement portion can be avoided.

At least one of the fitting portions is a rolling portion, and the rolling portion adopts a roller sleeve or a roller pin. The rolling portion can rotate around an axis of the rolling portion on the driving wheel 12, the rolling portion is rollably engaged with the engagement portion, and a diameter of a last rolling portion 12-6 engaged with the last engagement portion 11-6 away from the piston 13 is greater than diameters of the remaining rolling portions. The last rolling portion 12-6 is the fitting portion that finally releases the driver member 11 and bears a relatively large force. Therefore, the rolling portion can be set to relatively large, to reduce wear and ensure the strength of the engagement portion and the rolling portion. In addition, because the driver member 11 is subject to more pressure moving in the first direction A1 as the driver member reaches a releasable position, the diameters of the first engagement portion 12-1 to the last rolling portion 12-6 are gradually increased, or are gradually increased in twos and threes. For example, the diameters of the fitting portions (rolling portions) are designed as 12-1=12-2=12-3≤12-4=12-5=12-6, or 12-1=12-2≤12-3=12-4≤12-5=12-6, or 12-1≤12-2=12-3=12-4=12-5≤12-6, or the like.

In another embodiment, referring to FIG. 34 to FIG. 37, a first rolling portion 12-1' engaged with the first engagement portion 11-1 adjacent to the piston 13 is in a non-cylindrical shape, for example, a flower-shaped roller sleeve. The first rolling portion 12-1' is provided with a plurality of bump portions 113 extending radially outward, and the plurality of bump portions 113 are uniformly arranged at intervals around an outer surface of the first rolling portion. There may be 4 to 8, 16 to 18 or 20, or the like bump portions 113, which are specifically determined according to a diameter of the first rolling portion 12-1' and a shape of the abutting portion 32. The first rolling portion 12-1' is provided with a plurality of inward recessed portions 114, where a radius of the recessed portion 114 is R3 In the thickness direction, an arc is formed by the abutting portion 32, the meshing surface 34, and the crossing surface 33 of at least one of the engagement portions, a radius of the arc is R4, and the radius R3 of the recessed portion 114 is not greater than the arc radius R4 of the abutting portion 32. This can effectively prevent the recessed portion 114 of the first rolling portion 12-1' from being stuck with the abutting portion 32 during rotation.

Figure 34:
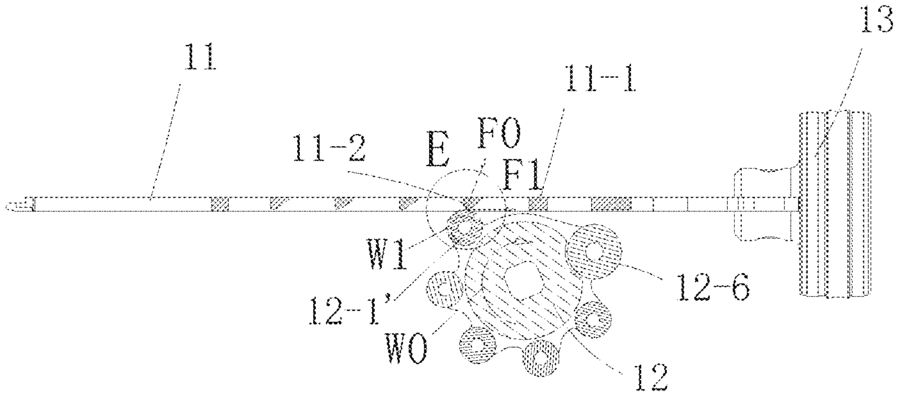
FIG. 34 is a cross-sectional view of abnormal engagement between a driving wheel and a driver member according to another embodiment.
Figure 35:
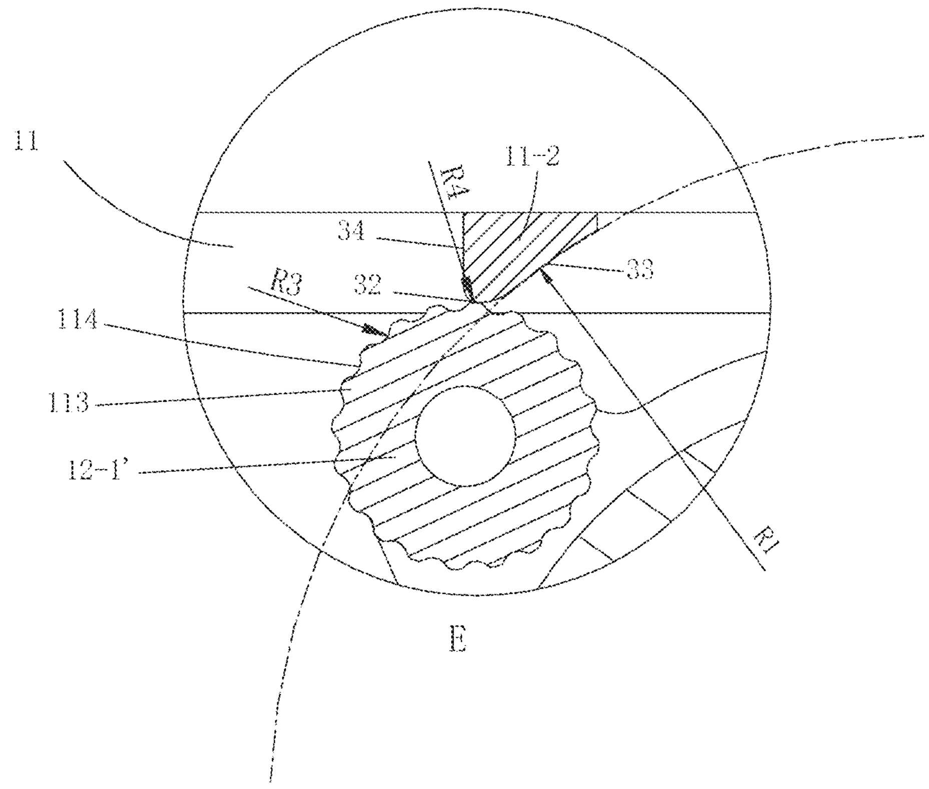
FIG. 35 is a partially enlarged view at E in FIG. 34.
Figure 36:
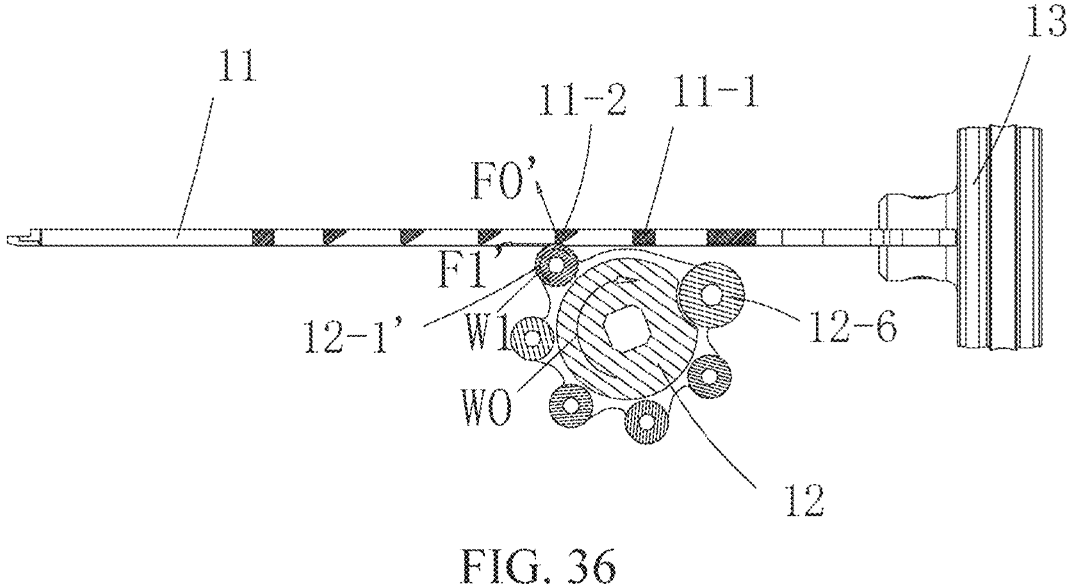
FIG. 36 is a schematic diagram of a force of abnormal engagement between a driving wheel and a driver member.
Figure 37:
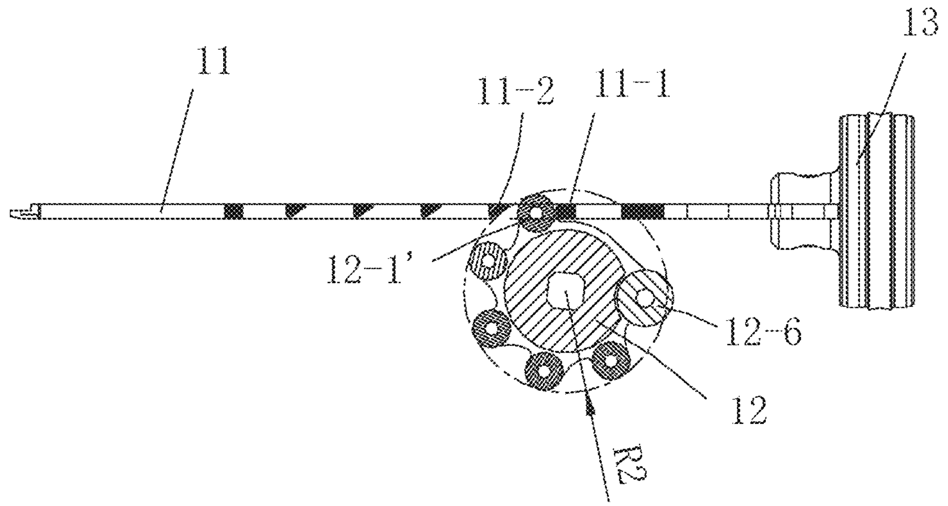
FIG. 37 is a partial size identification diagram of a driving wheel and a driver member.

As shown in FIG. 34, when the engagement portion is abnormally engaged with the fitting portion, and a similar dead position occurs, a contact point on the driver member 11 is subject to a force from the energy storage mechanism to drive the driver member 11 to move in the first direction A1, a reaction force when a nail is jammed, and a force driven by rotation of a driving wheel in a direction W0, a resultant force on the contact point is F0, a component force of F0 is F1, and the first rolling portion 12-1' rotates in a direction W1 to adjust a position state after being subject to a comprehensive force. In this case, the first rolling portion 12-1' may be oppositely in contact with the engagement portion of the driver member 11, to adjust a force direction and reach a state shown in FIG. 36 after adjustment. In this case, a resultant force on the contact point on the driver member 11 is F0', and a component force of F0' is F1', so that the driver member 11 moves in the first direction A1, the first rolling portion 12-1' extrudes the driver member 11 to move in the first direction A1, the first rolling portion 12-1' may avoid the similar dead position to complete normal engagement, to reach a position shown in FIG. 37, so as to normally lift the driver member 11, thereby more effectively avoiding interference and struck between the engagement portion and the fitting portion.

Figure 38:
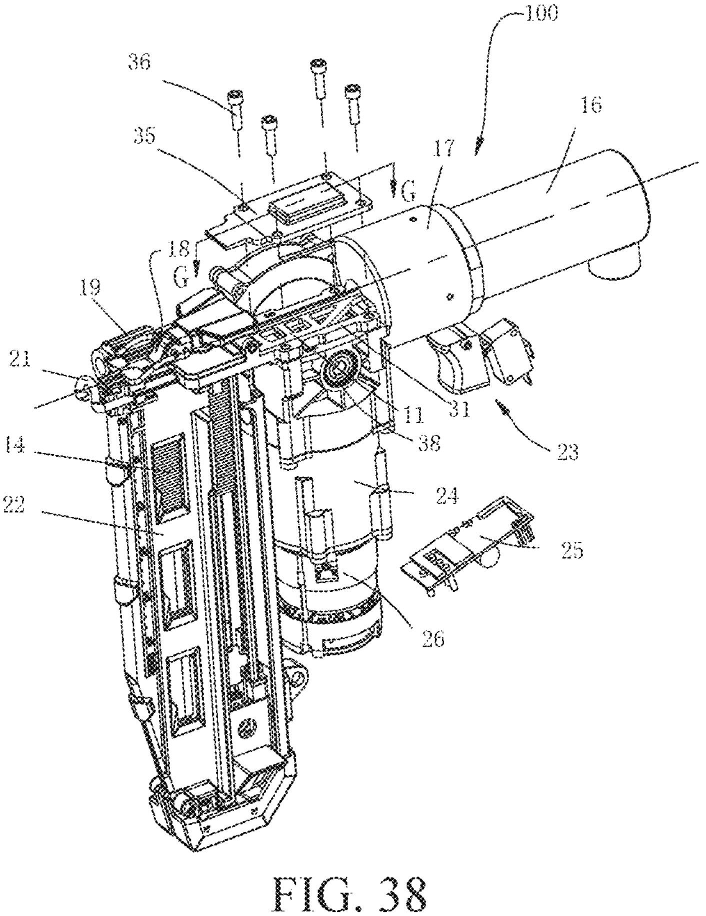
FIG. 38 is a schematic structural diagram of a nail gun in which a pressing plate is separated after components such as a housing are hidden.
Figure 39:
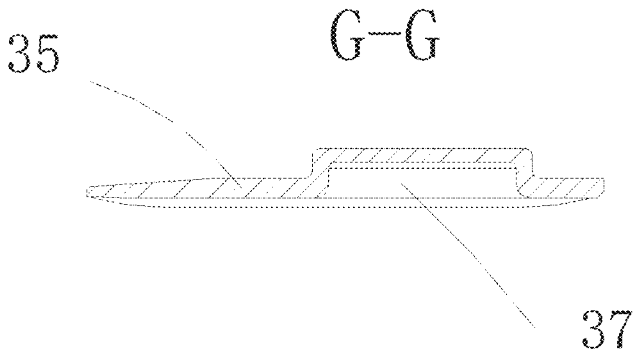
FIG. 39 is a cross-sectional view of a pressing plate captured along a line G-G in FIG. 38.

FIG. 38 is a partial view of a nail gun 100 with a bearing chamber 38 after a pressing plate 35 is removed, and other structures are the same as that in FIG. 28. The pressing plate 35 is located above the driver member 11. FIG. 39 is a cross-sectional view of a pressing plate 35 captured along a line G-Gin FIG. 38. The pressing plate 35 is provided with a groove 37 for avoiding the driving wheel, and the groove may avoid the fitting portion on the driving wheel 12. The pressing plate 35 has rigidity and wear resistance, and is fixed on the muzzle 18 by using a pressing plate fastener 36, and the pressing plate fastener 36 may adopt a screw/bolt, or the like. Specifically, the pressing plate 35 and a lower cover plate 31 of the muzzle 18 are fixed on the gear box by using the pressing plate fasteners 36. There are four pressing plate fasteners 36, which are respectively located on two sides of a center of a rotating shaft of the driving wheel 12, so that the force on the pressing plate 35 is more uniform, and it is not easy to cause large warping deformation due to a unilateral force. The driver member 11 is located between the pressing plate 35 and the driving wheel 12, and the pressing plate 35 presses down the driver member 11 to guide the movement of the driver member 11, so as to ensure that the driver member 11 has sufficient rigidity and hardness when being lifted, prevent the driver member 11 from being bent and deformed when moving in the first direction A1 and the second direction A2, and ensure that the pressing plate 35 is not easily deformed and worn when being subject to a force, so that the tool is normally and stably operated, to improve the operation stability and the use safety of the tool.

Figure 40:
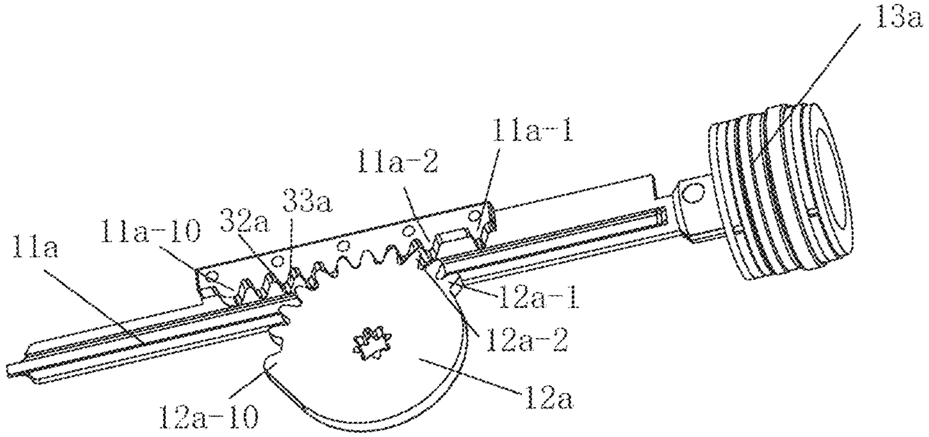
FIG. 40 is a three-dimensional view of engagement between a driving wheel and a driver member according to still another embodiment.
Figure 41:
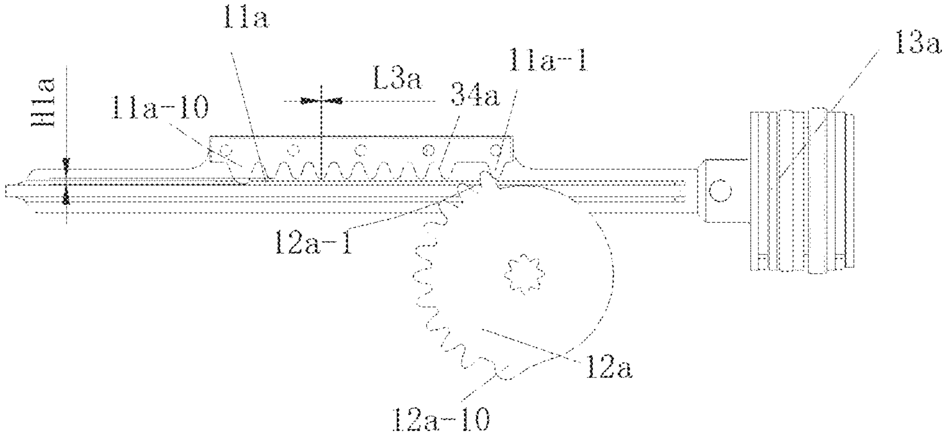
FIG. 41 is a top view of engagement between a driving wheel and a driver member.

In still another embodiment, referring to FIG. 40 and FIG. 41, one end of a driver member 11*a* is connected to a piston 13*a*, the other end of the driver member 11*a* is configured to drive a fastener, a plurality of engagement portions 11*a*-1 to 11*a*-10 are arranged on the driver member 11*a*, and a plurality of fitting portions 12*a*-1 to 12*a*-10 are arranged on a driving wheel 12*a*, a distance of a longitudinal axis between the engagement portion 11*a*-1 and the engagement portion 11*a*-2 is different from distances among the remaining engagement portions, and a quantity of engagement portions does not completely correspond to a quantity of fitting portions, the engagement portions on the driver member 11*a* are provided with abutting portions 32*a* close to the driving wheel 12*a*, meshing surfaces 34*a* engaged with the fitting portions on the driving wheel 12*a*, and crossing surfaces 33*a* opposite to the meshing surfaces 34*a*, and an extending length L3*a* of at least one of the abutting portions 32*a* in a direction of a longitudinal axis of the driver member 11*a* ranges from 0 mm to 1 mm, which may be between 0 mm and 0.5 mm, in one embodiment, which is between 0 mm and 0.25 mm, and in other embodiments, which is 0 mm. Alternatively, a length of a projection of at least one of the root portions along the first axis is greater than lengths of projections of the abutting portions 32*a* along the first axis. Alternatively, in the thickness direction, at least one of the crossing surfaces 33*a* is gradually close to the meshing surfaces 34*a* in a direction toward the driving wheel 12*a*, and an angle between the crossing surface 33*a* and the meshing surface 34*a* is greater than 15 degrees and less than 75 degrees, which may be 30 degrees to 75 degrees, in one embodiment, which is 30 degrees to 55 degrees, and in other embodiments, which is about 40 degrees.

The plurality of engagement portions protrude from a main body of the driver member 11 in a direction intersecting the longitudinal axis, and are arranged at intervals along the longitudinal axis, and the protrusion amounts of the engagement portions are different. A direction perpendicular to the longitudinal axis and perpendicular to the rotation axis of the driving wheel 12*a* is defined as a thickness direction of the driver member 11*a*. In the thickness direction, other engagement portion on the driver member 11*a* away from the muzzle 18 are higher than the last engagement portion 11*a*-10 away from the piston 13, that is, thicknesses of the other engagement portions away from the muzzle 18 are less than a thickness of the last engagement portion 11*a*-10 away from the piston 13. That is, there is H1*a*, and H1*a* is not less than 0.2 mm, which may be not less than 0.3 mm. In addition, H1*a* of each engagement portion may be the same or may be different. Alternatively, a distance between the last engagement portion 11*a*-10 on the driver member 11*a* away from the piston 13*a* and the axis of the driving wheel in the thickness direction is less than distances between other engagement portions 11*a*-1 to 11*a*-9 and the axis of the driving wheel in the thickness direction, that is, in the thickness direction, the other engagement portions 11*a*-1 to 11*a*-9 are farther away from the driving wheel than the last engagement portion 11a-10. Therefore, the interference between the fitting portion and the engagement portion can be avoided.

An example embodiment relates to a driving tool, and in particular, to a nail gun. A plurality of engagement portions are arranged on a driver member, and a plurality of fitting portions are arranged on a driving wheel, to achieve lifting. The fitting portions are alternately engaged with the engagement portions in a one-to-one correspondence under the action of rotation of the driving wheel, so that the driver member moves in a second direction opposite to a nailing direction. The engagement portions are provided with abutting portions close to the driving wheel, and a length of at least one of the abutting portions in a direction of a longitudinal axis of the driver member is less than 1 mm. Therefore, during lifting, an abnormal interference case in which the fitting portions forcibly abut against the engagement portions does not occur. Especially, when an abnormal case such as a jam of a fastener occurs, the fitting portions can be smoothly engaged with the engagement portions, to avoid abnormal operations of abnormal meshing and blockage and burnout of the motor and improve the operation stability and the use safety of the tool.

In the nail gun in one embodiment, the length of the abutting portion on the engagement portion on the driver member close to the driving wheel in the direction of the longitudinal axis is set to be sufficiently small, to avoid the abnormal interference case in which the driver member forcibly abuts against the driving wheel. The engagement portions on the driver member and the fitting portions on the driving wheel are reasonably arranged, to ensure that an engagement strength meets a working requirement, completely eliminate the abnormal operations of meshing interference and blockage and burnout of the motor, so that the tool runs stably and is operated safely.

Terminologies "comprise", "have", and any variations thereof in this application are intended to indicate non-exclusive inclusion. For example, a process, method, system, product, or device that includes a series of steps or units is not limited to the listed steps or units, but further, for example, includes a step or unit that is not listed, or further, for example, includes another step or unit that is intrinsic to the process, method, product, or device.

"Embodiment" mentioned in the specification means that particular features, structures, or characteristics described with reference to the embodiment may be included in at least one embodiment of this application. The term appearing at different positions of the specification may not refer to the same embodiment or an independent or alternative embodiment that is mutually exclusive with another embodiment. A person skilled in the art explicitly or implicitly understands that the embodiments described in the specification may be combined with other embodiments.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing embodiments only describe several implementations of the present disclosure, and their description is specific and detailed, but cannot therefore be understood as a limitation to the patent scope of the present disclosure. It should be noted that a person of ordinary skill in the art may be further make variations and improvements without departing from the conception of the present disclosure, and these all fall within the protection scope of the present disclosure. Therefore, the protection scope of the patent of the present disclosure shall be topic to the appended claims.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, the terms "first" and "second" are used merely for the purpose of description, and shall not be construed as indicating or implying relative importance or implying a quantity of indicated technical features. Therefore, features defining "first" and "second" can explicitly or implicitly include at least one of the features. In the description of the present disclosure, unless otherwise explicitly defined, "a plurality of" means at least two, for example, two, three and the like.

In the present disclosure, unless otherwise explicitly specified and defined, terms such as "mounted", "connected", "fixed" should be understood in broad sense, for example, fixed connection, detachable connection, or integral connection; or the connection may be a mechanical connection or an electrical connection; or the connection may be a direct connection, an indirect connection through an intermediary, or internal communication between two elements or mutual action relationship between two elements, unless otherwise specified explicitly. The specific meanings of the above terms in the present disclosure may be understood according to specific circumstances for a person of ordinary skill in the art.

In the present disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

It should be noted that, when a component is referred to as "being fixed to" or "being arranged on" another component, the component may be directly on the other component, or an intervening component may be present. When a component is considered to be "connected to" another component, the component may be directly connected to the other component, or an intervening component may also be present. The terms "vertical", "horizontal", "upper", "down", "left", "right" and similar expressions used in this specification are only for purposes of illustration but do not indicate a unique implementation.

What is claimed is:

1. A nail gun comprising:

a housing;

a power output portion arranged in the housing;

a magazine configured to provide fasteners for the nail gun;

a muzzle configured to receive a driven fastener;

a driver assembly comprising a driver member and a base that is in mechanical communication with the driver member, wherein the driver member extends along a first axis in a longitudinal direction; and a lifting assembly configured to drive the driver member to move to drive the base to move from a bottom-dead-center position to a top-dead-center position, wherein:

the lifting assembly comprises a driving wheel that is driven by the power output portion and rotates around a second axis, and a plurality of fitting units is arranged on a periphery of the driving wheel at intervals;

a plurality of engagement units is arranged on the driver member along a direction of the first axis;

the plurality of fitting units is configured to alternately engage with respective corresponding engagement units under an action of the driving wheel;

at least one of the plurality of fitting units is a rolling portion, the rolling portion being capable of rotating around an axis of the rolling portion, the rolling portion is movably engaged with a corresponding engagement unit; and an engagement unit closest to the base among the plurality of engagement units is defined as a first engagement unit, and a fitting unit engaging with the first engagement unit is a first rolling portion, and the first rolling portion is non-cylindrical and has a main body portion and a plurality of bump portions extending radially outward from the main body portion.

2. The nail gun according to claim 1, wherein the plurality of bump portions is equally arranged at intervals around the main body portion.

3. The nail gun according to claim 1, wherein:

a direction perpendicular to the first axis and perpendicular to the second axis is defined as a thickness direction of the driver member;

each of the plurality of engagement units is provided with an abutting portion close to a side of the driving wheel in the thickness direction;

each of the plurality of engagement units further comprises a meshing surface and a crossing surface, and the meshing surface and the crossing surface are connected to the abutting portion and respectively located on two sides of the abutting portion along the direction of the first axis, and the plurality of engagement units is alternately engaged with corresponding fitting units through meshing surfaces to drive the driver member to move along the first axis.

4. The nail gun according to claim 3, wherein: for at least one of the plurality of engagement units, a corresponding abutting portion connects a corresponding meshing surface and a corresponding crossing surface to form an arc surface.

5. The nail gun according to claim 4, wherein:

the first rolling portion is provided with a plurality of arc-shaped grooves in a circumferential direction; and a radius (R3) of an arc-shaped groove is not greater than an arc radius (R4) of the arc surface.

6. The nail gun according to claim 3, wherein a length (L3, L3*a*) of at least one of abutting portions in the direction of the first axis ranges from 0 mm to 1 mm.

7. The nail gun according to claim 3, wherein for at least one of the plurality of engagement units, a corresponding crossing surface and a corresponding meshing surface gradually approach each other in a direction extending toward a corresponding abutting portion.

8. The nail gun according to claim 3, wherein the meshing surface is perpendicular to the first axis, and an angle (β) between the crossing surface and the meshing surface is greater than 15 degrees and less than 75 degrees.

9. The nail gun according to claim 3, wherein at least one of crossing surfaces of the plurality of engagement units is configured as a concave arc surface.

10. The nail gun according to claim 9, wherein:

a distance (R2) between an outer edge of a first fitting unit and a rotation center of the driving wheel is not greater than a curvature radius (R1) of a corresponding crossing surface of the first engagement unit.

11. The nail gun according to claim 3, wherein a minimum distance between an engagement unit farthest from the base of the driver member and an axis of the driving wheel in the thickness direction is less than a minimum distance between other engagement units and the axis of the driving wheel in the thickness direction.

12. The nail gun according to claim 1, wherein:

a quantity of the plurality of fitting units is defined as n, which is sequentially a first fitting unit to an $n^{th}$ fitting unit according to an order of being engaged with the plurality of engagement units; and when the base moves from a bottom-dead-center to near the top-dead-center position, the $n^{th}$ fitting unit is disengaged from a corresponding engagement unit.

13. The nail gun according to claim 12, wherein the first fitting unit and a second fitting unit are arranged at a first angle (α1), and a second angle (α2) between a $(n-1)^{th}$ fitting unit and the $n^{th}$ fitting unit is not less than the first angle (α1).

14. The nail gun according to claim 12, wherein a third angle (α3) between the $n^{th}$ fitting unit and the first fitting unit is greater than a second angle (α2) between a $(n-1)^{th}$ fitting unit and the $n^{th}$ fitting unit.

15. The nail gun according to claim 12, wherein radial sizes (D2) of the first fitting unit to a $(n-1)^{th}$ fitting unit are equal in a diameter direction of the driving wheel, and a radial size (D1) of the $n^{th}$ fitting unit in the diameter direction of the driving wheel is not greater than a corresponding radial size of the first fitting unit.

16. The nail gun according to claim 12, wherein the plurality of fitting units is respectively rotatably supported on the driving wheel through roller sleeves, and a diameter (D4) of a roller sleeve of the $n^{th}$ fitting unit is greater than a diameter (D3) of a roller sleeve of the first fitting unit.

17. The nail gun according to claim 12, wherein the $n^{th}$ fitting unit is rotatably supported on the driving wheel through the roller sleeve of the $n^{th}$ fitting unit, and the roller sleeve of the $n^{th}$ fitting unit is cylindrical.

18. The nail gun according to claim 1, wherein:

the power output portion comprises a motor and a transmission mechanism;

the transmission mechanism comprises:

an output wheel, which is arranged coaxially with a motor output shaft;

a transmission member, which meshes with the output wheel and is arranged coaxially with the driving wheel;

a rotation axis of the output wheel is perpendicular to a rotation axis of the transmission member; and both the driver member and the output wheel are located on a side of a meshing surface on the transmission member, and a rotation axis of the driving wheel is located on a same side of the driver member close to the motor.

19. The nail gun according to claim 1, wherein a pressing plate is arranged above the driver member; and the pressing plate is provided with a groove for giving way to the driving wheel, and the pressing plate is fixedly arranged on the muzzle.

* * * * *